(12) United States Patent
Bates et al.

(10) Patent No.: US 7,975,269 B2
(45) Date of Patent: Jul. 5, 2011

(54) PARALLEL PROCESSOR METHODS AND APPARATUS

(75) Inventors: John P. Bates, Redwood City, CA (US); Keisuke Inoue, Tokyo (JP); Mark E. Cerny, Los Angeles, CA (US)

(73) Assignee: Sony Computer Entertainment Inc., Tokyo (JP)

( * ) Notice: Subject to any disclaimer, the term of this patent is extended or adjusted under 35 U.S.C. 154(b) by 1374 days.

(21) Appl. No.: 11/461,390

(22) Filed: Jul. 31, 2006

(65) Prior Publication Data

US 2007/0198628 A1    Aug. 23, 2007

Related U.S. Application Data

(63) Continuation-in-part of application No. 11/238,077, filed on Sep. 27, 2005, and a continuation-in-part of application No. 11/238,087, filed on Sep. 27, 2005, and a continuation-in-part of application No. 11/238,095, filed on Sep. 27, 2005, now Pat. No. 7,522,168, and a continuation-in-part of application No. 11/238,085, filed on Sep. 27, 2005, now Pat. No. 7,506,123.

(51) Int. Cl.
  *G06F 9/46* (2006.01)
(52) U.S. Cl. ........ 718/100; 718/102; 718/103; 718/104; 718/105
(58) Field of Classification Search .................. 718/100, 718/101, 102, 103, 104
  See application file for complete search history.

(56) References Cited

U.S. PATENT DOCUMENTS

| 3,496,551 | A | * | 2/1970 | Driscoll et al. | ............... 718/102 |
| 3,596,257 | A | | 7/1971 | Patel | |
| 5,047,923 | A | | 9/1991 | Elstner et al. | |

(Continued)

FOREIGN PATENT DOCUMENTS

EP    0 806 730    11/1997

(Continued)

OTHER PUBLICATIONS

U.S. Appl. No. 11/238,077, entitled "Cell Processor Methods and Apparatus", to John P. Bates et al, filed Sep. 27, 2005.

(Continued)

*Primary Examiner* — Kenneth Tang
*Assistant Examiner* — Willy W Huaracha
(74) *Attorney, Agent, or Firm* — Joshua D. Isenberg; JDI Patent

(57) ABSTRACT

Methods and apparatus for parallel processors are disclosed. A policy module is loaded from a main memory of a processor into the local memory of a selected secondary processing element under control of a policy module manager running on the secondary processing element. A selected one or more work queues are assigned from a main memory to a selected one or more of the secondary processing elements according to a hierarchy of precedence. A policy module for the selected one or more work queues is loaded to the selected one or more secondary processing elements. The policy module interprets the selected one or more of the selected one or more work queues. Under control of the policy module, work from one or more of the selected one or more work queues is loaded into the local memory of the selected secondary processing element. The work is performed with the selected secondary processing element. After completing the work or upon a pre-emption, control of the selected secondary processing element is returned to the policy module manager.

42 Claims, 8 Drawing Sheets

U.S. PATENT DOCUMENTS

| | | | |
|---|---|---|---|
| 5,136,712 A | 8/1992 | Perazolli et al. | |
| 5,185,694 A | 2/1993 | Edenfield et al. | |
| 5,452,452 A | 9/1995 | Gaetner et al. | 395/650 |
| 5,504,901 A | 4/1996 | Peterson | |
| 5,528,513 A | 6/1996 | Vaitzblit et al. | |
| 5,592,671 A | 1/1997 | Hirayama | 385/674 |
| 5,745,778 A | 4/1998 | Alfieri | 395/800.01 |
| 5,794,017 A | 8/1998 | Evans et al. | 395/507 |
| 5,832,262 A | 11/1998 | Johnson et al. | 395/672 |
| 5,872,972 A * | 2/1999 | Boland et al. | 718/102 |
| 6,003,112 A | 12/1999 | Tetrick | |
| 6,144,986 A | 11/2000 | Silver | |
| 6,279,040 B1 | 8/2001 | Ma et al. | 709/231 |
| 6,289,369 B1 * | 9/2001 | Sundaresan | 718/103 |
| 6,295,598 B1 | 9/2001 | Bertoni et al. | |
| 6,341,324 B1 | 1/2002 | Caulk et al. | |
| 6,370,681 B1 | 4/2002 | Dellarocas et al. | |
| 6,378,072 B1 | 4/2002 | Collins et al. | |
| 6,463,457 B1 | 10/2002 | Armentrout et al. | |
| 6,526,491 B2 | 2/2003 | Suzuoki et al. | |
| 6,633,897 B1 * | 10/2003 | Browning et al. | 718/103 |
| 6,665,699 B1 | 12/2003 | Hunter et al. | 709/102 |
| 6,665,783 B2 | 12/2003 | Zahir | |
| 6,728,959 B1 | 4/2004 | Merkey | 718/102 |
| 6,785,756 B2 * | 8/2004 | Candea et al. | 710/220 |
| 6,993,762 B1 * | 1/2006 | Pierre | 718/102 |
| 6,996,822 B1 * | 2/2006 | Willen et al. | 718/102 |
| 7,058,750 B1 | 6/2006 | Rankin et al. | |
| 7,080,379 B2 * | 7/2006 | Brenner et al. | 718/105 |
| 7,127,477 B2 | 10/2006 | Duncombe et al. | |
| 7,178,145 B2 * | 2/2007 | Bono | 718/100 |
| 7,236,738 B2 | 6/2007 | Settle | |
| 7,236,998 B2 | 6/2007 | Nutter et al. | |
| 7,298,377 B2 | 11/2007 | Fossum et al. | |
| 7,304,646 B2 | 12/2007 | Iwata | |
| 7,321,958 B2 | 1/2008 | Hofstee et al. | |
| 7,478,390 B2 | 1/2009 | Brokenshire et al. | |
| 7,516,456 B2 | 4/2009 | Aguilar et al. | |
| 7,522,168 B2 | 4/2009 | Stenson et al. | |
| 7,565,651 B1 | 7/2009 | Carey | |
| 2002/0138637 A1 | 9/2002 | Suzuoki et al. | 709/230 |
| 2003/0115241 A1 * | 6/2003 | Saito et al. | 709/102 |
| 2003/0154284 A1 | 8/2003 | Bernardin et al. | |
| 2003/0195920 A1 | 10/2003 | Brenner et al. | |
| 2004/0054883 A1 | 3/2004 | Goodman et al. | 713/1 |
| 2004/0208178 A1 * | 10/2004 | Tuck et al. | 370/392 |
| 2005/0081203 A1 | 4/2005 | Aguilar et al. | |
| 2005/0091473 A1 | 4/2005 | Aguilar et al. | |
| 2005/0188372 A1 | 8/2005 | Inoue et al. | 718/100 |
| 2005/0188373 A1 | 8/2005 | Inoue et al. | 718/100 |
| 2006/0190942 A1 | 8/2006 | Inoue et al. | 718/100 |
| 2007/0198628 A1 | 8/2007 | Bates et al. | |
| 2009/0031317 A1 * | 1/2009 | Gopalan et al. | 718/103 |
| 2009/0147013 A1 | 6/2009 | Stenson et al. | |
| 2009/0165003 A1 * | 6/2009 | Jacobson et al. | 718/102 |

FOREIGN PATENT DOCUMENTS

| | | |
|---|---|---|
| GB | 2394336 | 4/2004 |
| WO | WO 97/06484 | 2/1997 |
| WO | 0203208 | 1/2002 |
| WO | WO 02/091180 | 11/2002 |
| WO | WO 2004/084069 | 9/2004 |

OTHER PUBLICATIONS

U.S. Appl. No. 11/238,087, entitled "SPU Task Manager for Cell Processor" to John P. Bates et al, filed Sep. 27, 2005.

U.S. Appl. No. 11/238,095 entitled "Cell Processor Task and Data Management" to Richard B. Stenson et al, Sep. 27, 2005.

U.S. Appl. No. 11/238,085 entitled "Method and System for Performing Memory Copy Function on a Cell Processor" to Antoine Labour et al, filed Sep. 27, 2005.

U.S. Appl. No. 11/238,086 entitled "Operating Cell Processors Over a Network" to Tatsuya Iwamoto, filed Sep. 27, 2005.

U.S. Appl. No. 11/257,761 entitled "Secure Operation of Cell Processors" to Tatsuya Iwamoto, filed Oct. 24, 2005.

U.S. Appl. No. 60/650,153 entitled "Processor Task Migration Over a Network in a Multi-Processor System" to Keisuke Inoue et al, filed Feb. 4, 2005.

D S Milojicic et al., "Process Migration" ACM Computing Surveys, ACM, New York, NY, US, vol. 32, No. 3, Sep. 2000, pp. 241-299, XP002254767 ISSN: 0360-0300.

K Chanchio et al., "Data Collection and Restoration for Heterogeneous Process Migration" Software Practice & Experience, Wiley & Sons, Bognor Regis, GB, vol. 32, No. 9, Jul. 25, 2002, pp. 845-871, XP001115308 ISSN: 0038-0644.

European Search Report for European application No. 06254919 dated Dec. 21, 2007.

Sony Computer Entertainment Incorporated, "Cell Broadband Engine Architecture", Version 1.0, Aug. 8, 2005.

Pratit Santiprabhob et al. "Fuzzy Rule-Based Process Scheduling Method for Critical Distributed Computing Environment"—Proceedings 2003 IEEE, Mar. 8, 2003, vol. 5, pp. 52267-52276.

J. A. Kahle et al. "Introduction to the Cell Multiprocessor" IBM Journal of Research and Development, vol. 49, No. 4-5, , Jul. 2005, pp. 589-604.

George M. Candea et al. "Vassal: Loadable Scheduler Support for Multi-Policy Scheduling" Proceedings of the Usenix Window NT Symposium, Aug. 1998, pp. 157-166.

Alexandre E. Eichenberger et al., "Optimizing Compiler for a Cell Processor", Proceedings of 14th International Conference on Parallel Architectures and Compilation Techniques, 2005 (PACT'05), pp. 161-172.

B. Flachs et al., "A Streaming Processing Unit for a Cell Processor", 2005 IEEE International Solid-State Circuits Conference—Digest of Technical Papers, pp. 134-135.

Scott Whitman, "Dynamic Load Balancing for Parallel Polygon Rendering", IEEE Computer Graphics and Applications, vol. 14, No. 4, Jul. 1994, pp. 41-48.

Jaspal Subhlok et al., "Communication and Memory Requirements as the Basis for Mapping Task and Data Parallel Programs", Supercomputing' 94, Proceedings Washington, DC, 1994 IEEE, pp. 330-339.

Alan Heirich, "Optimal Automatic Multi-Pass Shader Partitioning by Dynamic Programming", Graphics Hardware (2005), pp. 91-98.

International application No. PCT/US2006/037345, "The International Search Report" and "The Written Opinion of the International Searching Authority".

International application No. PCT/US2006/037334, "The International Search Report and The Written Opinion of the International Searching Authority".

International application No. PCT/US2006/037336, "The International Search Report and The Written Opinion of the International Searching Authority".

International application No. PCT/US2006/037338, "The International Search Report and The Written Opinion of the International Searching Authority".

Office Action (Final) dated Apr. 20, 2009 for U.S. Appl. No. 11/238,086.

Office Action (Final) dated May 7, 2009 for U.S. Appl. No. 11/257,761.

Office Action dated Mar. 12, 2010 issued for U.S. Appl. No. 11/238,077.

Office Action dated Feb. 20, 2008 issued for U.S. Appl. No. 11/238,085.

Office Action dated Oct. 16, 2009 issued for U.S. Appl. No. 11/371,424.

Notice of Allowance and Fee Due(s) dated Mar. 8, 2010 issued for U.S. Appl. No. 11/371,424.

Office Action dated Aug. 30, 2007 issued for U.S. Appl. No. 11/238,085.

Notice of Allowance and Fee(s) Due dated Nov. 25, 2008 issued for U.S. Appl. No. 11/238,095.

Office Action dated Nov. 4, 2008 issued for U.S. Appl. No. 11/238,086.

Office Action dated Nov. 24, 2008 issued for U.S. Appl. No. 11/257,761.

Office Action dated Jun. 22, 2010 issued for U.S. Appl. No. 11/238,086.

Final Office Action dated Feb. 5, 2010 issued for U.S. Appl. No. 11/238,086.
Office Action dated Aug. 11, 2009 issued for U.S. Appl. No. 11/238,086.
Office Action dated May 13, 2008 issued for U.S. Appl. No. 11/238,086.
Notice of Allowance and Fee(s) Due dated Jan. 26, 2010 issued for U.S. Appl. No. 11/257,761.
U.S. Appl. No. 12/787,344, filed May 25, 2010.
Office Action dated Aug. 27, 2009 issued for U.S. Appl. No. 11/257,761.
Notice of Allowance and Fee Due(s) dated Nov. 3, 2008 issued for U.S. Appl. No. 11/238,085.
Final Office Action dated Aug. 5, 2008 issued for U.S. Appl. No. 11/238,085.
Office Action dated Apr. 14, 2010 issued for U.S. Appl. No. 11/238,087.
Office Action dated May 27, 2010 for Chinese patent application No. 200610142304.7 and its English translation.
Office Action dated May 6, 2010 for Chinese patent application No. 200610142305.1 and its English translation.
William et al., "The Potential of the Cell Processor for Scientific Computing", Conference on Computing Frontiers, ACM, 2006, pp. 9-20.
Gschwind, "Chip Multiprocessing and the Cell Broadband Engine", ACM, 2006, pp. 1-7.
Office Action dated Jan. 10, 2008 for U.S. Appl. No. 11/238,095.
Final Office Action dated Jul. 29, 2008 for U.S. Appl. No. 11/238,095.

* cited by examiner

200

202 — SPMM SELECTS WQ FOR SPU TO WORK ON FROM WORK DEFINITIONS IN WQ ARRAY

204 — SPMM LOADS POLICY MODULE FOR WQ FROM MAIN MEMORY INTO LS OF SELECTED SPU

206 — POLICY MODULE PROCESSES SELECTED WORK QUEUE (E.G. LOADS WORK QUEUE TASK(S) CODE/DATA FROM MAIN MEMORY TO LOCAL MEMORY OF SELECTED SPU)

208 — SELECTED SPU COMPLETES TASK(S) OR IS PRE-EMPTED

210 — POLICY MODULE RETURNS CONTROL OF SELECTED SPU TO SPMM.

FIG. 2A

PARALLEL PROCESSOR METHODS AND APPARATUS

CROSS-REFERENCE TO RELATED APPLICATIONS

This application is a continuation-in-part of and claims priority from U.S. patent application Ser. No. 11/238,077, to John P. Bates et al, filed Sep. 27, 2005 and entitled "CELL PROCESSOR METHODS AND APPARATUS", the entire disclosures of which are incorporated herein by reference.

This application is also a continuation-in-part of and claims priority from U.S. patent application Ser. No. 11/238,087 entitled "SPU TASK MANAGER FOR CELL PROCESSOR" to John P. Bates, Payton R. White, Richard Stenson, Howard Berkey, Attila Vass and Mark Cerny, filed Sep. 27, 2005, the entire disclosures of which are incorporated herein by reference.

This application is also a continuation-in-part of and claims priority from U.S. patent application Ser. No. 11/238,095 entitled "CELL PROCESSOR TASK AND DATA MANAGEMENT" to Richard B. Stenson and John P. Bates, Sep. 27, 2005 now U.S. Pat. No. 7,522,168, the entire disclosures of which are incorporated herein by reference.

This application is also a continuation-in-part of and claims priority from U.S. patent application Ser. No. 11/238,085 entitled "METHOD AND SYSTEM FOR PERFORMING MEMORY COPY FUNCTION ON A CELL PROCESSOR" to Antoine Labour John P. Bates and Richard B. Stenson, filed Sep. 27, 2005 now U.S. Pat. No. 7,506,123, the entire disclosures of which are incorporated herein by reference.

This application is also related to commonly-assigned U.S. patent application Ser. No. 11/238,086 entitled "OPERATING CELL PROCESSORS OVER A NETWORK" to Tatsuya Iwamoto, filed Sep. 27, 2005, the entire disclosures of which are incorporated herein by reference.

This application is also related to commonly-assigned U.S. patent application Ser. No. 11/257,761 entitled "SECURE OPERATION OF CELL PROCESSORS" to Tatsuya Iwamoto, filed Oct. 24, 2005, the entire disclosures of which are incorporated herein by reference.

FIELD OF THE INVENTION

This invention generally relates to parallel processing and more particularly to scheduling across various programming models in parallel processors.

BACKGROUND OF THE INVENTION

A major advance in electronic computation has been the development of systems that can perform multiple operations simultaneously. Such systems are said to perform parallel processing. Recently, cell processors have been developed to implement parallel processing on electronic devices ranging from handheld game devices to main frame computers. A typical Cell processor has a power processor unit (PPU) and up to 8 additional processors referred to as synergistic processing units (SPU). Each SPU is typically a single chip or part of a single chip containing a main processor and a co-processor. All of the SPUs and the PPU can access a main memory, e.g., through a memory flow controller (MFC). The SPUs can perform parallel processing of operations in conjunction with a program running on the main processor. The SPUs have small local memories (typically about 256 kilobytes) that must be managed by software—code and data must be manually transferred to/from the local SPU memories. For high performance, this code and data must be managed from SPU software (PPU software involvement must be minimized). There are many techniques for managing code and data from the SPU. Often, different techniques for managing code and data from the SPU need to operate simultaneously on a cell processor. There are many programming models for SPU-driven task management. Unfortunately, no single task system is right for all applications.

One prior art task management system used for cell processors is known as SPU Threads. A "thread" generally refers to a part of a program that can execute independently of other parts. Operating systems that support multithreading enable programmers to design programs whose threaded parts can execute concurrently. SPU Threads operates by regarding the SPUs in a cell as processors for threads. A context switch may swap out the contents of an SPU's local storage to the main memory and substitute 256 kilobytes of data and/or code into the local storage from the main memory where the substitute data and code are processed by the SPU. A context switch is the computing process of storing and restoring the state of a SPU or PPU (the context) such that multiple processes can share a single resource. Context switches are usually computationally intensive and much of the design of operating systems is to optimize the use of context switches.

Unfortunately, interoperating with SPU Threads is not an option for high-performance applications. Applications based on SPU Threads have large bandwidth requirements and are processed from the PPU. Consequently SPU-threads based applications are not autonomous and tend to be slow. Because SPU Threads are managed from the PPU, SPU context switching (swapping out the current running process on an SPU to another waiting process) takes too long. Avoiding PPU involvement in SPU management can lead to much better performance for certain applications To overcome these problems a system referred to as SPU Runtime System (SPURS) was developed. In SPURS, the memory of each SPU has loaded into it a kernel that performs scheduling of tasks handled by the SPU. Groups of these tasks are referred to as Tasksets. SPURS is described in PCT Application, PCT/JP2006/310907, to Keisuke Inoue and Seiji Murata filed May 31, 2006 entitled "METHOD AND APPARATUS FOR SCHEDULING IN A MULTI-PROCESSOR SYSTEM", and in U.S. Patent Application Publication No. 20050188373, to Keisuke Inoue, Tatsuya Iwamoto and Masahiro Yasue, Filed Feb. 20, 2004 and entitled "METHOD AND APPARATUS FOR TASK MANAGEMENT IN A MULTI-PROCESSOR SYSTEM", and in U.S. Patent Application Publication No. 20050188372 to Keisuke Inoue and Tatsuya Iwamoto filed Feb. 20, 2004 and entitled "METHOD AND APPARATUS FOR PROCESSOR TASK MIGRATION IN A MULTI-PROCESSOR SYSTEM" and in US Provisional Patent Application No. 60/650,153 to Keisuke Inoue and Masahiro Yasue, filed Feb. 4, 2005 and entitled "PROCESSOR TASK MIGRATION OVER A NETWORK IN A MULTI-PROCESSOR SYSTEM", the disclosures of all four of which are incorporated herein by reference. Unfortunately, SPURS, like SPU Threads, uses context switches to swap work in and out of the SPUs. The work is performed on the SPUs rather than the PPU so that unlike in SPU Threads there is autonomy of processing. However, SPURS suffers from the same overhead of context switches as SPU Threads. Thus, although SPURS provides autonomy it is not suitable for many use cases.

SPURS is just one example of an SPU task system. Middleware and applications will require various task systems for various purposes. Currently, SPURS runs as a group of SPU Threads, so that it can interoperate with other SPU Threads. Unfortunately, as stated above, SPU Threads has undesirable overhead, so using it for the interoperation of SPU task systems is not an option for certain high-performance applications.

In cell processing, it is desirable for middleware and applications to share SPUs using various task systems. It is desirable to provide resources to many task classes, e.g., audio, graphics, artificial intelligence (AI) or for physics such as cloth modeling, fluid modeling, or rigid body dynamics. To do this efficiently the programming model needs to manage both code and data. It is a challenge to get SPU middleware to interoperate with no common task system. Unfortunately, SPU Threads and SPURS follow the same programming model and neither model provides enough performance for many use cases. Thus, application developers still have to figure out how to share limited memory space on the SPUs between code and data.

Thus, there is a need in the art, for a cell processor method and apparatus that overcomes the above disadvantages.

SUMMARY OF THE INVENTION

To overcome the above disadvantages, embodiments of the invention are directed to methods and apparatus for cell processors having one or more central processors and one or more synergistic processing units (SPU), each SPU having a processor and a local memory. According to an embodiment of the invention managing code and data on one or more of the SPUs can be implemented by an inventive method. According to this method a policy module is loaded from a main memory into the local memory of a selected SPU under control of an SPU policy module manager (SPMM) running on one or more of the SPUs. The policy module may be configured to load a work queue from the main memory into the local memory of the SPU. Under control of the policy module, one or more tasks are loaded from the main memory into the local memory of the selected SPU. The policy module may be configured to interpret and process one or more tasks from the work queue on the SPU. The selected SPU performs the task(s) and after completing the tasks or upon a pre-emption, returns control of the SPU to the SPMM.

Embodiments of the present invention provide solutions for efficient interoperation of SPU policy modules.

BRIEF DESCRIPTION OF THE DRAWINGS

The teachings of the present invention can be readily understood by considering the following detailed description in conjunction with the accompanying drawings, in which:

FIG. 2A is a flow diagram illustrating an embodiment of a cell processor method according to an embodiment of the present invention.

DESCRIPTION OF THE SPECIFIC EMBODIMENTS

Although the following detailed description contains many specific details for the purposes of illustration, anyone of ordinary skill in the art will appreciate that many variations and alterations to the following details are within the scope of the invention. Accordingly, the exemplary embodiments of the invention described below are set forth without any loss of generality to, and without imposing limitations upon, the claimed invention.

Figure 1:
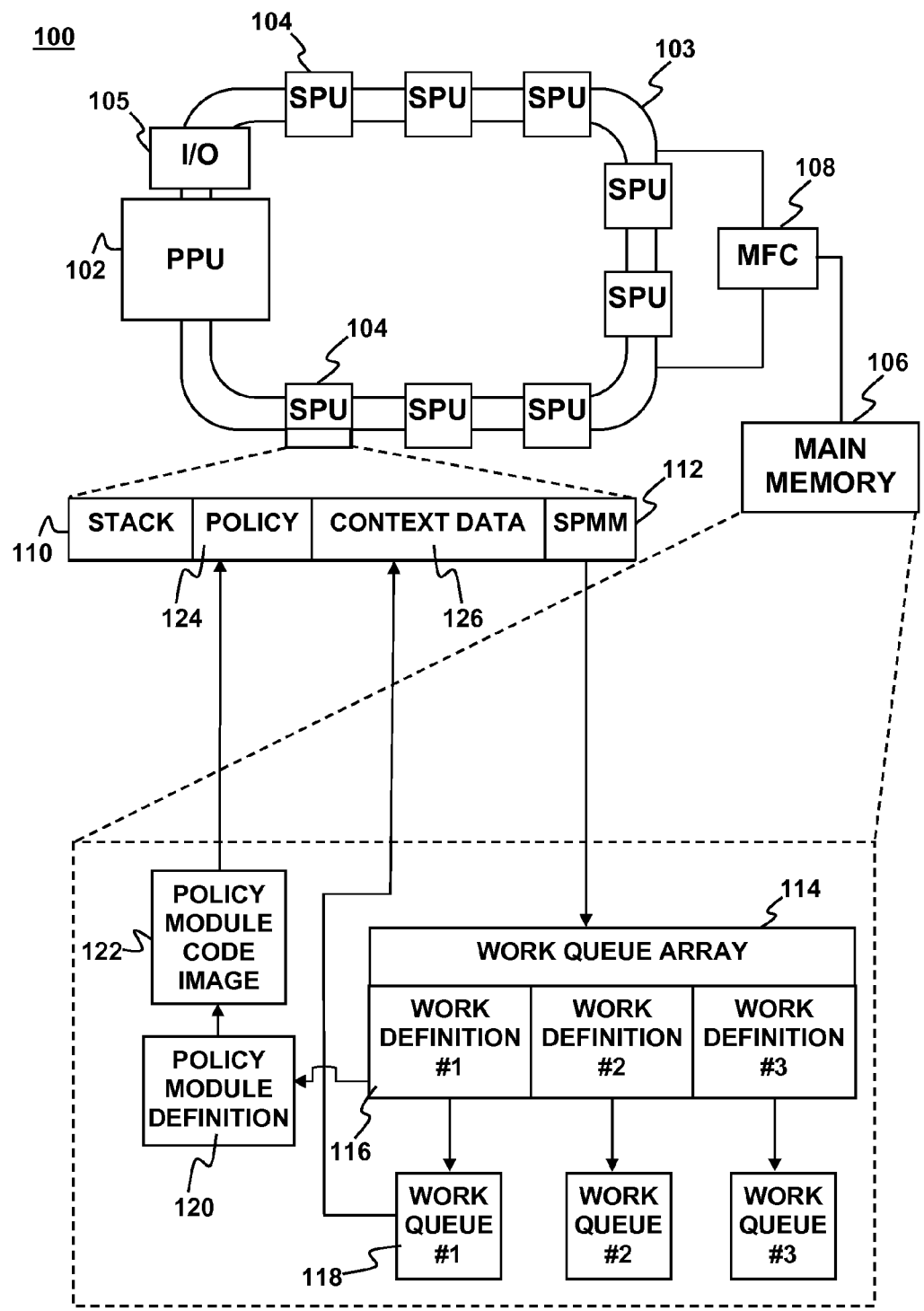
FIG. 1 is a schematic diagram of a cell processor according to an embodiment of the present invention.

FIG. 1 is a schematic depiction of a cell processor 100. According to an embodiment of the present invention, the cell processor 100 generally includes a power processor unit (PPU) 102 and several synergistic processing units (SPU) 104. In FIG. 1, a single PPU 102 and eight SPU 104 are shown for the sake of example. Cell processors having two or more PPU and a greater or lesser number of SPU may be used in conjunction with embodiments of the present invention.

The PPU 102 acts as a controller for the SPUs 104, which handle most of the computational workload. The PPU 102 may also be used to run conventional operating systems if it is sufficiently similar to other 64-bit PowerPC processors, and if the SPUs 104 are designed for vectorized floating point code execution. By way of example, the PPU 102 may contain a 32 KiB instruction and data Level 1 cache and a 512 KiB Level 2 cache.

The PPU 102 and SPUs 104 can exchange code and data with each other over an exchange interface bus (EIB) 103. The PPU 102 and SPUS 104 can also exchange code and data stored in a main memory 106, e.g., via the EIB 103 and a memory flow controller (MFC) 108 such as a digital memory access (DMA) unit or the like. The EIB 103 may be a circular bus having two channels in opposite directions. The EIB 103 may also be connected to the Level 2 cache, the MFC 108, and a system interface 105 such as a FlexIO for external communications.

Each SPU 104 includes a local memory 110. Code and data obtained from the main memory 106 can be loaded into the local memory 110 so that the SPU 104 can process tasks. As shown in the inset, a small software manager referred to herein as an SPU Policy Module Manager (SPMM) 112 resides in the local memory 110 of each SPU 104. Preferably, the SPMM 112 takes up only a small fraction of the total memory space available in each local memory 110 (e.g., less than about 1% of each SPU memory). The heart of SPMM 112 is referred to as an "SPMM Kernel", which typically takes up about 2 KB resident on each SPU. For a 256K local storage, this represents about 0.8% SPU Local Store usage.

The SPMM 112 manages policy modules. The SPMM Kernel provides Priority-based Work Queue scheduling. As used herein, the term "Work Queue" (sometimes also called a "Work Load") refers to work defined at some location in a memory, such as, SPU work defined in main memory 106. This is often a queue of task definitions; however other arrangements of work definitions may be used. A Policy Module associated with the work-queue determines how this work is interpreted and executed. Thus, the policy module interprets the Work Queue 118. A Work Queue is usually a group of tasks or jobs that can be processed by multiple SPUs. SPURS Tasksets or SPU Task Management (STM) job lists are examples of Workloads.

As used herein, "Policy Module" refers to a small manager object on an SPU that defines a programming model and task execution scheme. A policy module may be implemented as an SPU binary code for processing Work Queues 118. The software development kit (SDK) for a given application implemented in accordance with embodiments of the present invention may use different policies depending how a given work queue is to be implemented. For example one policy may be used for multi-tasking and another policy may be used for job streaming. Job streaming is a popular term for the STM processing model. A given Policy Module can manage code and/or data in the remaining SPU memory to execute SPU work. Policy Modules may be transferred from main RAM to SPU local storage to execute as needed by the current Work Queue. Other schemes of transferring a Policy Module from SPU to SPU are also recognized by the present inventors. The SPMM Kernel typically chooses a new Work Queue every time it runs.

The SPMM 112 implements the simplest set of features to enable scheduling of SPU work. Therefore, Policy Modules must manage their own context data. Policy Modules must determine their context data from a pointer to SPU work. A Policy Module image may be preprocessed with state data. For example, initialize some global data in the Policy Module ELF image based on runtime options. During execution of a Policy Module, state data may be changed by the SPU and passed from a Policy Module running in the SPU to main memory. The PPU may also change the state of state data in a Policy Module. The Policy Module is typically stored as an ELF image, which refers to executable linkable file format. After an ELF has been processed and linked to an image that image is ready to execute.

Embodiments of the present invention are able to avoid context switches because the work is loaded under control of the policy module running on the SPU 104. Although context switches are generally not performed by the SPMM Kernel, policy Modules may perform context switches because their implementation of is completely up to developers. However, many task systems will not need their context switched out, because they already manage code/data in the SPU Local Store 110. For example, SPURS will context switch SPURS Tasks to/from Local Store, but the SPURS Kernel does not need its own context to be saved/restored.

By way of example, policy modules and work queues may be associated as follows. As shown in the lower inset in FIG. 1, the main memory 106 may contain a work queue array 114 having a set of work definitions 116. The work queue array may include any number of work definitions 116 for any number of corresponding work queues 118. The number of work queues that the work queue array 114 can accommodate may depend on the availability for processing the work queues. In some embodiments the work queues 118 may be very efficiently scheduled amongst the SPUs 104 if there are definitions for sixteen work queues in the work queue array 114. Scheduling of sixteen work queues may be particularly efficient, e.g., where the SPMM kernel 112 has a limited amount of overhead, e.g., about 2 kilobytes and the cell processor 100 has eight SPUs.

Table I illustrates an example of a data structure for a work definition 116 stored in the work queue array 114.

TABLE I

| Bytes (13) | Work Definition |
|---|---|
| 4 | Memory address of Work |
| 4 | Memory address of Policy Module Definition |
| 1 | Priority |
| 1 | Contention (Number of SPUs) |
| 1 | Maximum Allowed Contention |
| 1 | Minimum Contention |
| 1 | State |

Table I represents one possible work definition, among others. The particular contents of work definitions data structures may vary from that of Table I. In general, each of the work definitions 116 includes a pointer to a memory address for the corresponding work queue (WQ) 118. The memory address includes SPU work defined in RAM, which may contain both code and data for the work queue 118. Examples of work queues include tasks, characterized e.g., Tasksets, or Task Queues and jobs characterized by job chains. Both tasks and jobs may contain code and/or data associated with performing associated work. Tasks may be distinguished from jobs as follows. As used herein, a task refers to work that is similar to a thread in that it has an associated context. As such, a task can be swapped in and out of an SPU at some intermediate stage of completion. A job, by contrast, has no associated context. Consequently, a job runs complete, i.e., once an SPU starts working on a job, the SPU runs until the job is complete. The data associated with a job may define how much space in SPU local memory 110 is needed to complete the job.

The Work Queue definition 116 may also include a value for the state of the corresponding WQ 118. Work Queue states can be set from either the PPU 102 or SPU 104. Examples of states include (a) SPM_READY-, which means that the WQ 118 contains ready work, (b) SPM_EMPTY-WQ, which means that the WQ 118 contains no ready work and (c) SPM_FREE-WQ, which means that the WQ 118 is no longer in use.

Contention refers to the number of SPU 104 that are working on a given WQ 118. Depending on the type of work, there may be a maximum number of SPUs 104 that can work on a given WQ 118. This number may be stored as part of the work definition 116. Certain types of work require two or more SPUs for efficient processing. In such cases, the output of one SPU may be forwarded to a second SPU for further processing. To address such cases, it is useful to define a minimum contention, i.e., a minimum number of SPUs needed to process the work. This number can also be stored as part of the work definition 116. The choice of the value of minimum contention for a particular work queue may depend on the nature of the work within the work queue. For example, task work queues often have interdependencies amongst tasks and may benefit from assignment of more than one SPU to their work. Consequently it may be desirable to set a minimum contention value for a task work queue equal to the total number of SPUs in the cell processor 100, e.g., eight for the system shown in FIG. 1. Job work queues, by contrast, tend to work better if contention for their work is balanced amongst the SPUs 104. Consequently it may be more desirable to set the minimum contention value for a job work queue equal to 1.

Each work queue 118 is associated with a Policy Module. In the case represented by Table I, the association between a work queue and its corresponding policy module is by way of a pointer to the memory address of a policy module definition 120. A Policy Module may be associated with multiple work queues. Table II illustrates an example of a policy module definition.

TABLE II

| Bytes (12) | Policy Module Definition |
|---|---|
| 4 | Address of Policy Module SPU code image |
| 4 | Size of SPU code image |
| 4 | Code image offset of function that takes Work pointer |

In Table II, the Code image offset refers to the entry point address for the first function call. In this example, the policy module definition 120 includes a pointer to a memory address containing the code image 122 of the policy module. It is this code image that is loaded into the local storage 110 by the SPMM 112. The loaded image then runs the SPU 104 as a policy module 124. The policy module controls the loading of work, e.g., context data 126 in the form of code or data into the local storage 110 from the work queue 118 in main memory 106.

FIG. 2A is a flow diagram illustrating a method 200 of processing with the cell processor 100 of FIG. 1. Operation of the cell processor 100 may be understood with reference to FIG. 1 and FIG. 2A. At step 202 the SPMM 112 running on one of the SPUs 104 selects a WQ 118 to process. The SPMM 112 chooses a new Work Queue if (1) the previous work was completed; or (2) the previous work was preempted. The algorithm for choosing a new queue may be, e.g., a simple linear search (e.g., one in which every work definition in the work queue array is searched until a match is found). However, the particular algorithm may vary. During Work Queue acquisition, an atomic mutex may be locked so that max-contention rules are obeyed. However, other synchronization techniques, including lock-free, may also work.

Figure 2B:
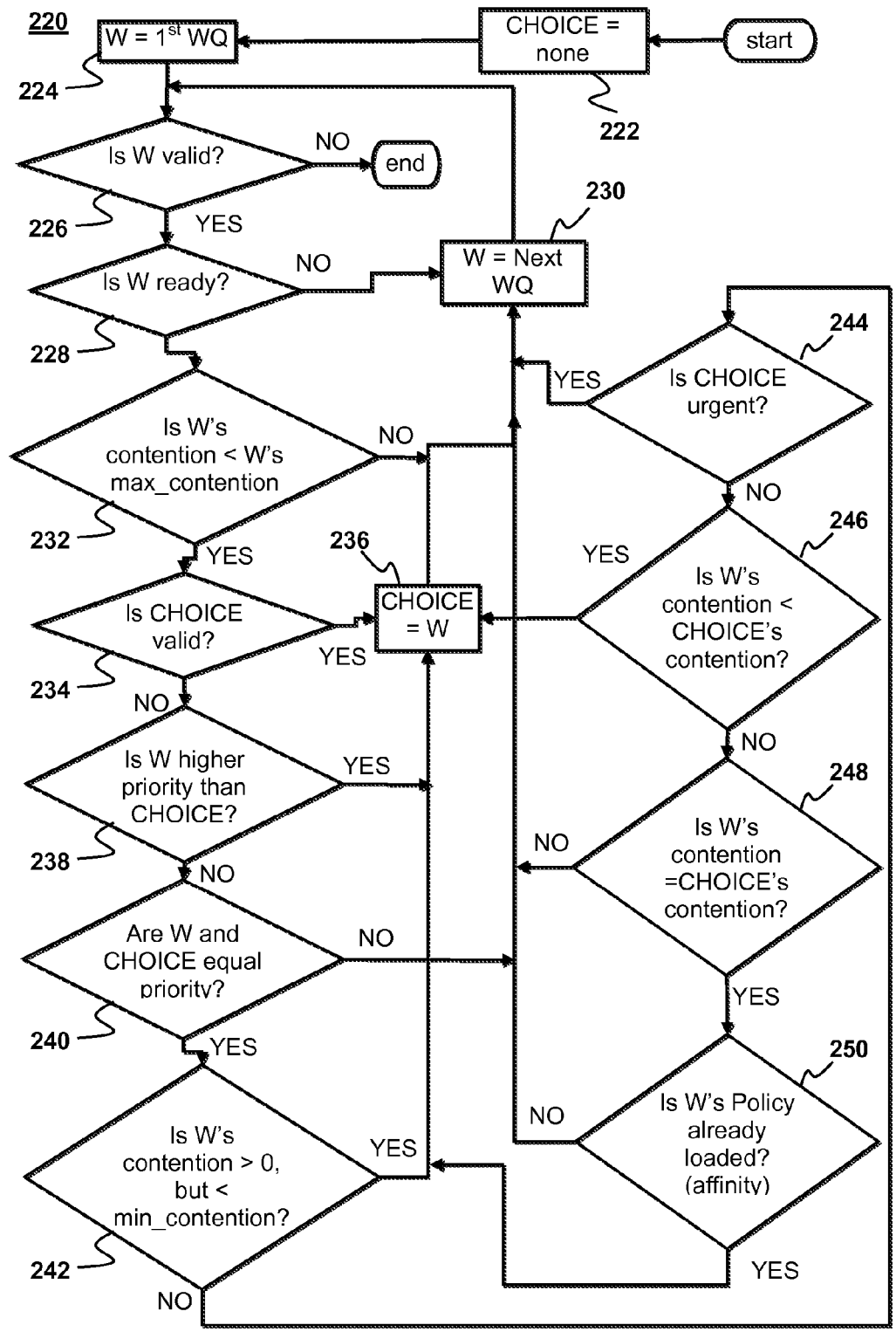
FIG. 2B is a flow diagram illustrating an algorithm for choosing work queues in a cell processor according to an embodiment of the present invention.

FIG. 2B is a flow diagram illustrating an example of an algorithm 220 for choosing a Work Queue at step 202. The algorithm 220 is run by the SPMM 112. Initially, a parameter CHOICE is set to none at step 222. The parameter CHOICE represents the Work Queue that the SPMM 112 chooses to process. A pointer W is set to point to the first Work Queue definition in the WQ array 114 at step 224. At step 226 the SPMM checks whether the Work Queue definition represents a valid Work Queue. If it is not, the algorithm ends. As an example of an invalid WQ definition consider a case where the Work Queue array 114 has a size, N. If the index of the Work Queue definition is greater or equal to N, it is invalid. The algorithm iterates over all valid Work Queue definitions. If the Work Queue definition is valid, the SPMM 112 checks whether the first Work Queue is ready for processing at step 228. By way of example SPMM 112 may check whether the state attribute of the Work Queue definition is set to "READY". If the first WQ is not ready, the value of W is set to point to the next WQ definition in the WQ array 114 at step 230 and the algorithm returns to step 226. If at step 232 the WQ is ready the SPMM 112 compares the WQ's contention (i.e., the number of SPUs currently working on it) to its max_contention (i.e., the most SPUs that could work on it). If the WQ's contention is greater than or equal to its max_contention, the value of W is set to point to the next WQ definition in the WQ array 114 at step 230 and the algorithm returns to step 226.

If the WQ's contention is less than its max_contention value the SPMM 112 then checks whether the value of CHOICE is valid at step 234. For example, if the initial value of CHOICE=none, it is invalid. If CHOICE is invalid, the value of CHOICE is set equal to the value of W at step 236 and the work corresponding to the value of W is selected for processing by the SPU 104. The value of W is set to point to the next WQ definition in the WQ array 114 at step 230 and the algorithm returns to step 226.

Referring again to FIG. 2A, once a WQ 118 is selected from among the Work definitions 116 in the WQ array 114 the SPMM 112 loads the corresponding policy module 124 from the main memory 106 into the local storage 110 of the SPU 104 at step 204. As described above, loading a policy module from the main memory 106 may include reading from the work definition 116 in a work queue array 114 a memory address of the policy module code image 122 in the main memory 106. The SPMM 112 implements the simplest set of features to enable scheduling of work on the SPU 104. The SPMM 112 does not assume anything about the contents of the WQ 118. Instead the Policy Module 124 determines WQ contents and usage and manages its own context data.

When a WQ 118 is chosen its contention value is incremented; its policy module code image 122 is transferred to local storage 110 (unless it is already resident); and the policy entry function is called with a pointer to the WQ 118. At step 206, under control of the policy module, the selected WQ is processed (e.g. one or more tasks from a work queue 118 are loaded from the main memory 106 into the local memory 110).

In practice, Work Queue contents will often be either an atomic mutex that protects a shared task queue or lock-free data related to a set of tasks. WQ array access may be serialized using an atomic lock to ensure that WQ contention is balanced and/or ensures that max-contention rules are followed. Lock-free access to work queues 118 is also possible; however, the code becomes more complex. In some cases only 128-byte sections of Work Queue definitions can be examined at a time. In addition it is not clear whether performance of the cell processor 100 would be any different. Performance may be better with few Work Queues, but may be worse with many Work Queues.

At step 208 the SPU performs one or more tasks from the work queue 118. Work Queues can be processed by one or more SPUs 104, simultaneously. As described above, a maximum number of contending SPUs (max contention) can be set for each WQ 118. The Policy Modules 124 returns control of the SPU 104 to the SPMM Kernel 112 at step 210 if either the previous work was completed or previous work was preempted.

The SPMM 112 schedules multiple SPU work-queues 118 based on priorities and readiness. When higher priority work becomes available, the SPMM 112 can assign high priority tasks to available SPUs. Embodiments of the present invention are said to be semi-preemptive in that they can also implement cooperative preemption. Specifically, the Policy Module 124 can periodically check an SPU event channel to determine preemption. If and when preemption occurs, the Policy Module 124 can clean up and return control of the SPU 104 to the SPMM 112. When higher priority work becomes ready, preemption events are sent to lower priority SPUs— Policy Modules return to allow processing of higher priority work. Priority and contention of a given task or work queue may be stored as part of the work definition in the work queue array.

The Policy Modules 124 have one required function: execute (EA work_queue) { . . . }, where EA stands for "effective address"—the main memory address of the WQ, from the chosen WQ definition. The function does not have to be called "execute", but it must take a single 32-bit parameter. The size of the parameter (e.g., 32-bits) may vary based on the implementation, but the parameter is the address of the chosen Work Queue. The execute function represents the entry point for the Policy Module. This function should process the Work Queue passed to it via the work_queue parameter. The execute function may be configured to return state information which can be passed to main memory in the PPU, depending on the particular configuration of the Policy Module. However the execute function to process a work queue will typically not return a value.

To end processing of a WQ the policy module 124 calls a function referred to herein as spmm_release_work (new state) which decrements the contention value for the WQ 118 and sets the value of the WQ state to new_state (typically SPMM_READY or SPMM_EMPTY depending on whether processing ends due to completion or pre-emption). To return control of the SPU to SPMM 112, the policy module 124 calls a function referred to herein as spmm_exit that resets a stack pointer to top of LS 110, and chooses a new WQ. The policy module 124 may be reused by the next chosen WQ, so policy module's stack size is typically at least 4 KB.

In embodiments of the present invention spmm_release_work is usually called immediately before spmm_exit. There is an important reason why they are not a single function. Often, WQs will allow new work to be added at any time. When new work is added to a WQ, its state must be set to SPM_READY. The Policy Module 124 must prevent undesirable race conditions (flaws in a process where the output exhibits unexpected critical dependence on the relative timing of events) with proper atomics.

For example, after the SPU 104 processes the last task in WQ 118 it may check the state of WQ 118. The PPU 102 may add work to the WQ 118 and set its state to SPM_READY before the Policy module calls spmm_release_work (new_ state). If the Policy Module 124 subsequently calls spmm_release_work (SPM_EMPTY), the state of WQ 118 will be incorrect when the policy module subsequently calls spmm_exit( ).

A preferred technique to prevent such invalid WQ states proceeds as follows. After the SPU 104 processes the last task in WQ 118 the Policy Module 124 locks an atomic mutex for the WQ 118 and then checks for more tasks in the WQ 118. If there are no more tasks, the Policy Module 124 calls spmm_release_work (SPM_EMPTY) and the state of the WQ 118 is set to SPM_EMPTY. The policy module 124 then unlocks the atomic mutex for the WQ 118. If the PPU 102 wants to add work to the WQ 118, the PPU 102 locks the atomic mutex for the WQ 118, adds the work, sets the state of the WQ 118 to SPM_READY and unlocks the atomic mutex for the WQ 118. Even if the work is added before the Policy Module 124 can call spmm_exit( ), the state of the WQ 118 will be correct.

It should be noted that even if the WQ 118 is never reused (state is set to SPM_FREE by PMs upon completion of tasks), there is still a potential race condition without atomics. Specifically, suppose a policy module running on a first SPU processes the last task in the WQ 118, checks for more tasks in the WQ 118 and determines that there are none. The SPU then signals the PPU 102 that the WQ 118 is complete. After the PPU 102 has received the signal it frees or reuses the memory space allotted for the WQ 118. Either way the memory space allotted for the WQ 118 may contain garbage data. If, before the policy module on the first SPU can call spmm_release_work (SPM_FREE), a second SPU under the control of the SPMM 112 then chooses the WQ 118 the second SPU may crash when it attempts to process the garbage data from the memory space allotted for WQ 118.

In avoiding this race condition with atomics it is important that the first SPU not signal the PPU that the WQ 118 is complete before calling spmm_release_work (SPM_FREE). To address the possibility that the second SPU may choose the WQ 118 after the mutex is locked but before calling spmm_release_work, the policy module on the first SPU can check the contention of the WQ 118. If a second SPU has chosen the WQ 118 and loaded its policy module, the contention will not be equal to zero (which would be expected for completed work). Instead of signaling the PPU that the work is complete, the first SPU unlocks the mutex and calls spmm_exit. The policy module running on the second SPU checks for more work on the WQ 118 and, upon finding none, calls spmm_release_work (SPM_FREE), sets the contention of the WQ 118 equal to zero, signals the PPU 102 that the WQ 118 is complete and unlocks the mutex.

Although the above discussion addresses atomic mutex locking to avoid race condition it may also be possible to avoid such conditions in a lock-free manner. In general, once the policy module determines that a given WQ contains no more tasks the policy module needs to prevent task states from being changed while the WQ state is set to empty. Alternatively, the processes of adding work or finishing work must be atomic. In the context of embodiments of the present invention, adding work includes setting the task state to "ready" in the policy module space and setting the SPMM WQ state to "ready." Finishing work refers to a condition in which the last task is either taken or set to a not_ready state. Finishing work includes updating the task state to not ready and setting the SPMM WQ state to "not ready".

The SPMM 112 may enable scheduling of multiple work Queues with different priorities. Higher priority queues can be processed before lower. When processing queues of equal priority, SPUs can balance contention. If the highest priority queue does not allow any more contention, other SPUs will work on the next highest priorities. Examples of pre-emption by the SPMM 112 can be understood by again referring to FIG. 2B. The policy module processing the WQ 118 on the SPU 104 continues to analyze the other WQ's (represented by pointer W) in the Work Queue array 114. At this point, the steps of the algorithm 220 may be implemented as part of the policy module running the process on the SPU 104. Recall that at step 234 the SPMM checked whether the value of CHOICE (which indicates the WQ 118 currently being processed by the SPU 104) is valid. If at step 238 the value of CHOICE is still valid the SPMM compares the priority of the chosen WQ to the priority of W. If W's priority is higher, this represents a pre-emption event and control of the SPU 104 returns to the SPMM 112. The value of CHOICE is set to the value of W (which represents a different work queue) at step 236 and the algorithm 220 returns to step 230 to increment the pointer W.

Pre-emption may also occur under certain circumstances when W and CHOICE are of equal priority at step 240. For example, if at step 242 the policy module 124 finds that W and CHOICE are of equal priority and W's contention is greater than zero but less than a minimum contention value (min_ contention) control of the SPU may be returned to the SPMM 112 at step 236. In such a case W is said to be "urgent". The concept of minimum contention is useful in situations where work cascades from one SPU to one or more other SPUs. For example, in many physics applications, such as cloth simulation, the output of one SPU serves as input for another SPU running a different part of a process implementing a given work queue. When such a work queue is of equal priority to other work being processed, the algorithm 220 attempts to balance the contention by making SPUs available for such a process. If enough SPUs are available to process the work, the output may be loaded directly into the next SPU. Alternatively, the output may be temporarily stored in the main memory 106 until additional SPUs become available to process the output.

If at step 242 it is determined that W is not "urgent" the policy module can check at step 244 whether CHOICE represents urgent work, e.g., by determining whether CHOICE's contention is greater than zero but less than its min_contention. If CHOICE is urgent the policy module 124 continues to check other work, e.g., by returning the algorithm to step 230. If CHOICE is not urgent, the policy module 124 can balance contention by checking whether W's contention is less than CHOICE's contention at step 246 and, if so, setting CHOICE equal to W at step 236 and returning control to the SPMM 112. If W's contention is not less than CHOICE's contention the policy module 124 can check whether W and CHOICE are of equal contention at step 248. If not, the policy module 124 continues to check other work, e.g., by returning the algorithm to step 230. If W and CHOICE are of equal contention, the policy module 124 may check, at step 250 whether there is affinity, i.e., if W's policy is already loaded into SPU 104. If there is affinity, the policy module may set CHOICE equal to W at step 236 and return control of the SPU 104 to the SPMM 112.

From the above discussion of it may be seen that work queues 118 may be assigned to SPUs 104 at step 202 of FIG. 2A according to a hierarchy of precedence. By way of example, a fiver-tiered hierarchy for the order of precedence of assigning work described with respect to FIG. 2B may be summarized as follows.

1. SCHEDULABILITY. Schedulable work has higher precedence than work that is not schedulable. As discussed above, examples of situations where work is not schedulable include:
   a. Priority=0
   b. Work Queue State=SPM_EMPTY, i.e., W is not ready at step 228.
   c. CONTENTION≧MAX_CONTENTION
2. PRIORITY. Assuming two or more work queues 118 are schedulable, work queues having higher priority work are favored over those with a lower priority. By way of example, higher priority may be associated with a lower (non-zero) priority value, e.g., priority 1 work takes precedence over priority 2 work.
3. URGENCY. For two or more schedulable work queues 118 having equal priority, work queues that are urgent are favored over those that are not. For example, work queues for which contention is greater than zero but less than minimum contention may be considered more urgent and has precedence over work for which this is not the case.
4. BALANCD CONTENTION. For two or more schedulable work queues 118 having equal priority and equal urgency the work queue having lesser contention is favored in order to balance contention as much as possible.
5. POLICY MODULE AFFINITY. For two or more schedulable work queues 118 having equal priority, equal urgency and for which contention is balanced, a work queue whose policy module is already loaded into the local store 110 of a particular SPU 104 is favored over a work queue for which this is not the case when assigning work to that particular SPU.

In embodiments of the present invention, additional considerations in determining precedence may enhance performance through a more even distribution of work amongst the various SPUs 104. Specifically, a work definition 116 may be structured as shown in Table III below.

TABLE I

| Work Definition |
| --- |
| Memory address of Work |
| Memory address of Policy Module Definition |
| Priority with respect to each SPU (e.g., 8 priorities for 8 SPUs) |
| Contention (Number of SPUs) |
| Maximum Allowed Contention |
| Minimum Contention |
| Ready Count |
| Idle SPU Request Count |
| Work Queue ID |

In Table III, the Ready Count refers to a number of SPUs requested by a work queue 118. A Ready Count value of zero may be used to mean there is nothing to process in a particular work queue 118. For example, if a policy module determines there is nothing to do in a particular work queue, it may reset the Ready Count to zero. A Ready Count value greater than zero is an estimate of the number SPUs that would be productive for processing a given work queue. The Ready Count value need not be an optimal number of SPUs for working on a particular work queue. Instead, the Ready Count value may represent an acceptable number of SPUs for working on a particular work queue 118.

In some situations, a particular workload 118 may benefit To further optimize the number of SPUs assigned to a particular work queue 118 may benefit if its work could be assigned to some number of available SPUs in addition to the Ready Count value. To address such a situation, the work queue definition 116 may include an Idle SPU Request Count (also known as an Idle Count). If there are idle SPUs, the Idle Count represents a number of SPUs in addition to the Ready Count value that can help out with processing a work queue 118. The advantage of the idle count is that it allows SPUs to begin processing a work queue 118 even if the number of available SPUs is less than ideal. For example, suppose a work queue 118 would ideally be processed by four SPUs but could acceptably be processed by one SPU. The work definition 116 for such a work queue may have a Ready Count value of 1 and an idle count value of 3. Use of the idle count allows such a work queue to begin processing if a single SPU becomes available but keeps open the possibility of assigning up to three additional SPUs as they become available.

It is noted that the work definition 116 may have more than one level of idle count. For example, the work definition 116 may have first, second and third level idle counts of 3, 2 and 1 respectively. In such a case three additional SPUs are quested if available, if not, two are requested if available and if not, one is requested if available.

As shown in Table III, the work definition 116 may also take into account the type of work within a given work queue 118 when assigning precedence. For example, all other considerations being equal, certain types of work queues 118 may take precedence over others based on the nature of the tasks or jobs that are to be performed. To address this situation, the work definition 116 may include a Work Queue ID that is associated with the type of work to be performed. The Work Queue ID categorizes the Work Queues 118 by the type of work to be performed, e.g., memory management work versus application-specific calculations.

When Ready Count, Idle Count and Work Queue ID are taken into account, the hierarchy of precedence for assigning work from the work queues to a particular SPU 104 as described above may be modified to form an eight-tiered hierarchy, which may be summarized as follows.

1. SCHEDULABILITY. Only schedulable work can be accessed by SPUs. As discussed above, examples of situations where work is not schedulable include:
   a. Priority=0
   b. Ready Count=0
   c. CONTENTION≧MAX_CONTENTION
   d. CONTENTION≧(Ready Count+Idle Count). This prevents too many SPUs being assigned to a particular Work Queue 118.
2. READINESS. For schedulable work, READINESS takes precedence over all other considerations. Specifically, a work queue 118 for which Contention<Ready Count has precedence over another work queue for which this is not the case. Alternatively, in some applications it may be desirable for there to be a hierarchy of "Readiness" that depends on the difference between Ready Count and Contention. For example, a workload for which Contention=1 and Ready Count=3 may take precedence over a workload for which Contention=1 and Ready Count=2.
3. PRIORITY. Assuming two or more work queues 118 are schedulable and are equally ready (e.g., (Ready Count<Contention), work queues having a higher priority work are favored over those with a lower priority. As in the above example, higher priority may be associated with a lower (non-zero) priority value, e.g., priority 1 work takes precedence over priority 2 work.
4. WORK QUEUE AFFINITY. For two or more schedulable work queues 118 having equal readiness and equal priority, a work queue whose code and/or data is already loaded into the local store 110 of a particular SPU 104 is favored over a work queue for which this is not the case when assigning work to that particular SPU.
5. URGENCY. For two or more schedulable work queues 118 having equal readiness, equal priority and equal work queue affinity work queue with greater urgency takes precedence over one with lesser urgency. For example, work queues for which contention is greater than zero but less than minimum contention may be considered more urgent and has precedence over work for which this is not the case.
6. BALANCED CONTENTION. For two or more schedulable work queues 118 having equal readiness, equal priority, equal work queue affinity and equal urgency the work queue having lesser contention is favored when assigning the work to a particular SPU 104 in order to balance contention as much as possible.
7. POLICY MODULE AFFINITY. For two or more schedulable work queues 118 having equal priority, equal work queue affinity, equal urgency and for which contention is balanced, a work queue whose policy module is already loaded into the local store 110 of a particular SPU 104 is favored over a work queue for which this is not the case when assigning work to that particular SPU.
8. WORKLOAD ID. For two or more schedulable work queues 118 having equal priority, equal work queue affinity, equal urgency, having equal policy module affinity and for which contention is balanced the work queue having a more preferred Workload ID is favored over one having a less preferred workload ID when assigning work to a particular SPU 104. For example, if one workload ID has a lesser numerical value than another workload ID, then it is preferred.

The above scheduling precedence is an example of many possible hierarchies of scheduling precedence. The order of precedence may be rearranged and items may be removed to achieve different behavior. For example, removing item number 4 (Work Queue Affinity) may result in work queues being scheduled in a manner that is more preferred by a developer, but it may also result in more work queue thrashing (when work queues yield to other work queues that go in and out of ready state).

According to embodiments of the invention, different developers working on particular programs may be responsible for different scheduling parameters. For example, a Policy Module Developer may be responsible for implementing Policy Module (PM) code and/or libraries a PM application programming interface (API) to create and manipulate Work Queues 118 for using PM code. The Policy Module Developer may determine the Minimum Contention values for policy modules that are to be associated with the Work Queues 118. The Policy Module Developer may optionally determine the Ready Count and Idle Count values.

A Work Queue Developer may create and manipulate Work Queues 118 through the PM API developed by the Policy Module Developer. The Work Queue Developer may determine the Ready Count and/or Idle Count for the Work Queues 118 to the extent allowed by the corresponding policy modules as determined by the Policy Module Developer. The Work Queue Developer may implement the work Queues 118 in the form code and/or data libraries.

An Integrator takes code and/or libraries from the above developers and combines them to form an application that shares a single SPU Task System Instance. As used herein, an SPU Task System Instance refers to the context of one instantiation of an SPU Task System within an application. The SPU Task System instance may include an associated SPU Thread Group, e.g., a particular assignment of Work Queues amongst the SPUs in the cell processor 100. For typical applications, the cell processor 100 usually (but not invariably) implements one SPU Task System Instance at a time. The Integrator may determine Maximum Contention values for each Work Queue 118 and develops an SPU Priority List containing Per-SPU priorities for each Work Queue 118. The SPU Priority List provides the integrator with fine control over Workload scheduling.

Figure 2C:
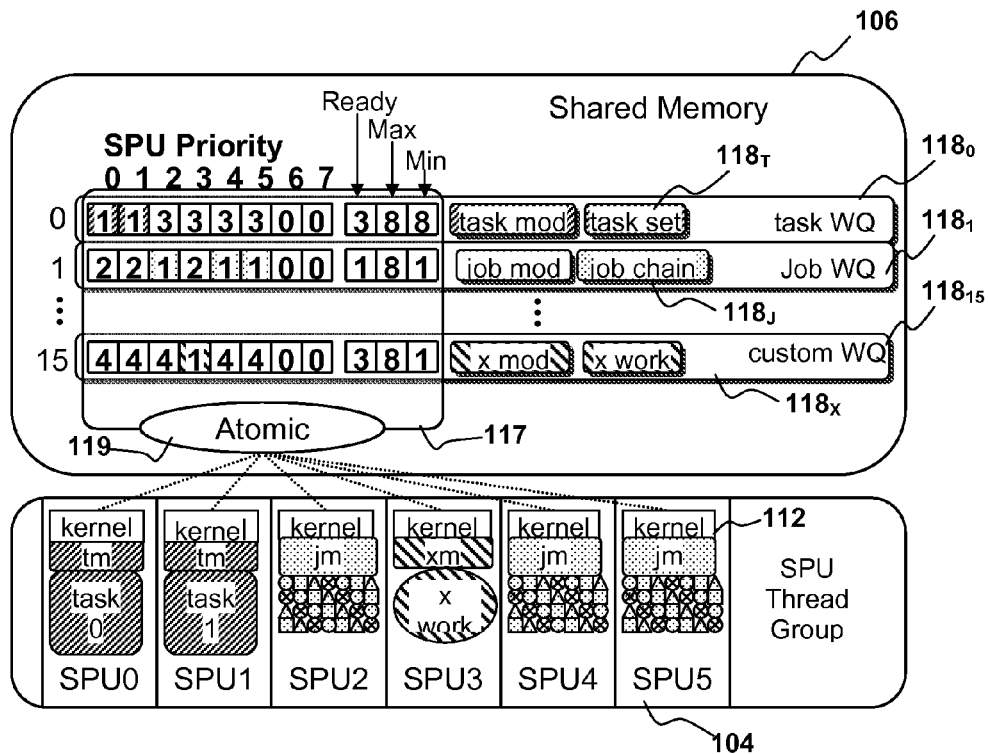
FIGS. 2C-2H are block diagrams illustrating implementation of a precedence hierarchy for assignment of work to SPUs in a cell processor according to an embodiment of the present invention.

Operation of a cell processor using the precedence hierarchy of Table III may be understood with reference to FIGS. 2C-2H. As shown in FIG. 2C multiple Work Queues $118_0 \ldots 118_{15}$ may be scheduled for implementation by eight SPUs 104. In FIG. 2C only six SPUs are depicted in the SPU Thread Group for the purpose of illustration. By way of example, and without limitation, SPMM Kernel 112 may use an Atomic Notifier 119 to schedule the Work Queues $118_0 \ldots 118_{15}$. The Atomic Notifier 119 may be, e.g., a 128 byte data structure that contains relevant Work Queue scheduling parameters. The Work Queues $118_0 \ldots 118_{15}$ may include a task Work Queue $118_0$ having a task policy module task mod and work defined by a task set $118_T$. In some embodiments there may be an upper limit on the number of tasks in the task Work Queue $118_0$. For example, there may be an upper limit of 128 tasks for a given tasks Work Queue even if the Main Memory 106 could accommodate more. The Work Queues $118_0 \ldots 118_{15}$ may further include a job Work Queue $118_1$ having a job policy module job mod and work defined by a job chain $118_J$. The number of jobs in the job chain may be almost unlimited, e.g., limited only by considerations of memory space available in the Main Memory 106. The Work Queues $118_0 \ldots 118_{15}$ may additionally include a custom Work Queue $118_{15}$ having a custom policy module x mod and custom work $118_x$, e.g., code and data of some kind. The Custom Work Queue $118_{15}$ may fall into a category that does not fit the description of either a "task" or a "job" as defined herein.

Each of the Work Queues $118_0 \ldots 118_{15}$ includes corresponding work definitions $116_0 \ldots 116_{15}$ that include per-SPU priority values and stored values of Ready Count Ready, Maximum Contention Max and Minimum Contention Min. The combined priority values for the contending Work Queues $118_0 \ldots 118_{15}$ form a priority table 117. In FIG. 2C, each column of the priority table 117 corresponds to a particular SPU in the cell processor 100. Each row of the priority table corresponds to a particular Work Queue. In the example depicted in FIG. 2C all the Work Queues Work Queues $118_0 \ldots 118_{15}$ have equal "Readiness", e.g., Contention<Ready Count. Consequently, precedence in assigning SPUs is given to Work Queues having lower priority values. As may be seen from FIG. 2C, work is assigned to an SPU from the priority table based on the lowest priority value in the column for that SPU. For example, for SPU0 and SPU1 task Work Queue $118_0$ has the lowest priority value and takes precedence. Consequently, SPU0 and SPU1 are assigned to Work Queue $118_0$. For SPU2, SPU4 and SPU5, job Work Queue $118_1$ has the lowest priority value and takes precedence over all others. Consequently, SPU2, SPU4 and SPU5 are assigned to job Work Queue $118_1$, For SPU3, custom Work Queue $118_{15}$ has the lowest priority value and SPU3 is assigned to custom Work Queue $118_{15}$.

FIG. 2C also illustrates the concepts of Schedulability and Urgency. It is noted that for all the Work Queues $118_0 \ldots 118_{15}$ the priority table 117 shows priority values of zero for SPU6 and SPU7. This means that no work will be assigned to SPU6 or SPU7. Furthermore, note that for Work Queue $118_0$ the Minimum Contention Min is equal to 8, which is greater than for the other Work Queues. This indicates that Work Queue $118_0$ has greater urgency than the others. However, since priority takes precedence over urgency, SPUs are assigned to the Work Queues on a per-SPU priority basis.

Figure 2D:
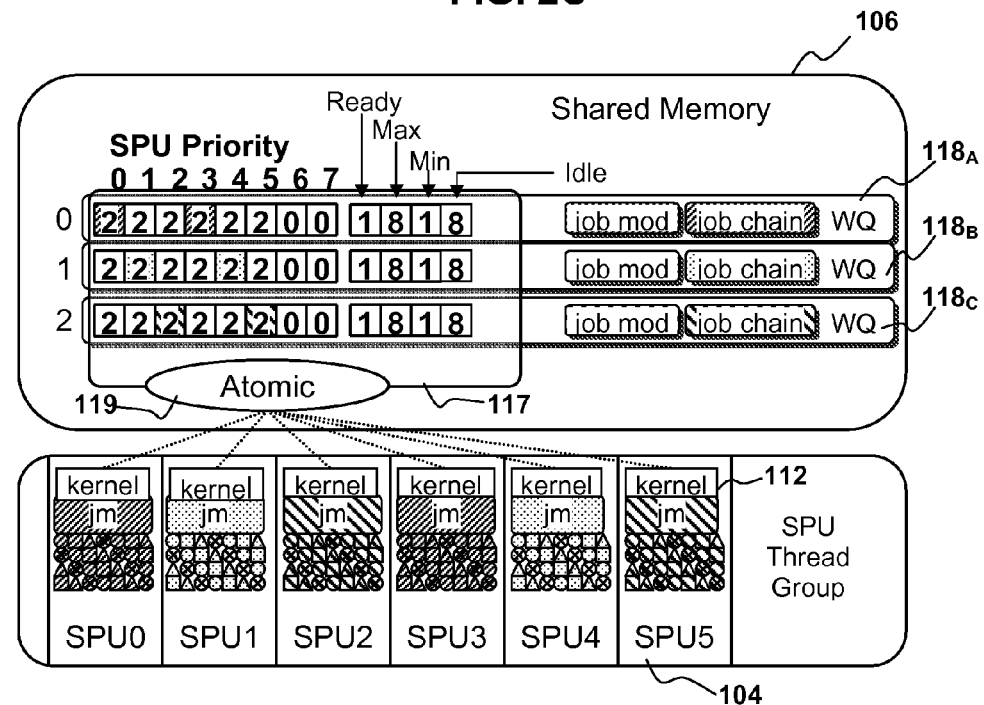

FIG. 2D illustrates an example of contention balancing. In this example three job Work Queues $118_A$, $118_B$, and $118_C$ compete for six available SPUS. As can be seen from the priority table 117 all three Work Queues have the same priority for all SPUs. In addition all three Work Queues have the same values of Ready Count, Minimum Contention and Maximum Contention. In this example, it is further assumed that for each job chain associated with the Work Queues $118_A$, $118_B$, and $118_C$ the idle count is equal to 8. It may be further assumed that all Work Queues initially have the same policy module affinity. For example, initially none of the SPUs may have had any policy module loaded in its local store. Alternatively, all SPUs may have had policy modules different from the policy modules for Work Queues $118_A$, $118_B$, and $118_C$. Furthermore each of the Work Queues $118_A$, $118_B$, and $118_C$ may have had the same policy module and this policy module may have been previously loaded into each of the SPUs.

Based on criteria 1 and 2 of the above hierarchy, initially, SPUs are assigned to Work Queues for which Ready Count is less than contention. Once all three Work Queues are equally Schedulable and Ready criterion 3 (Priority) takes precedence. However, in this example, all Work Queues have equal priority for all SPUs. Furthermore, since all Work Queues have equal policy module affinity and equal urgency, the remaining SPUs are assigned to the Work Queues according to criterion 6, i.e., in a manner that balances contention. Thus, SPU0 and SPU2 are assigned to work on Work Queue $118_A$, SPU3 and SPU5 are assigned to work on Work Queue $118_B$ and SPU4 and SPU6 are assigned to work on Work Queue $118_C$. Thus, in this example, the priority table has been configured such that, contention is balanced as much as possible amongst the Work Queues competing for available SPUs.

Figure 2E:
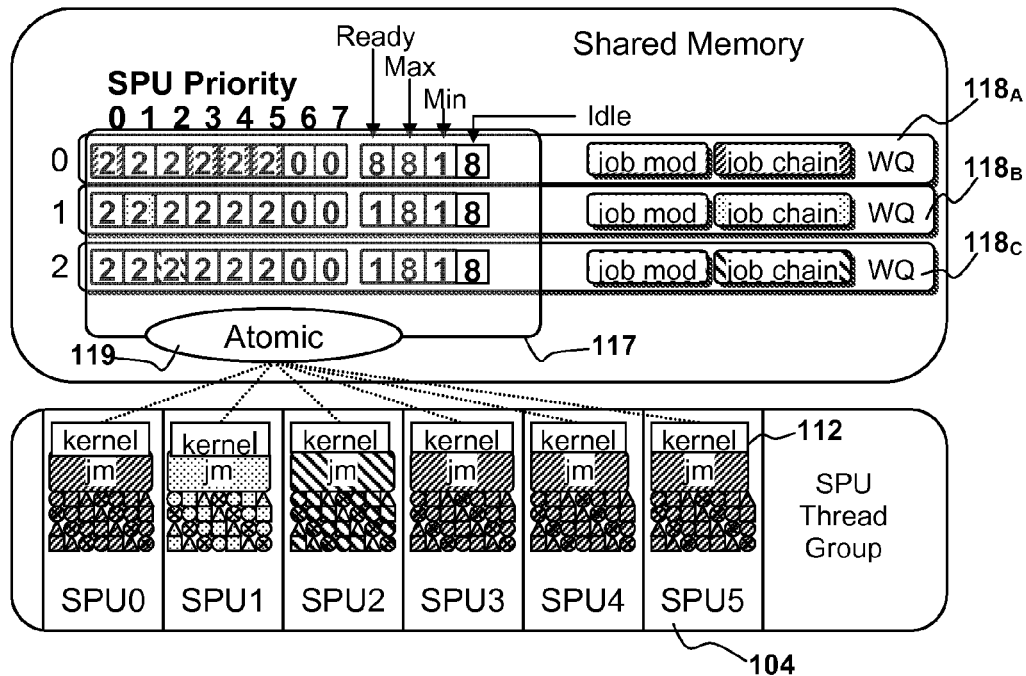
Figure 2F:
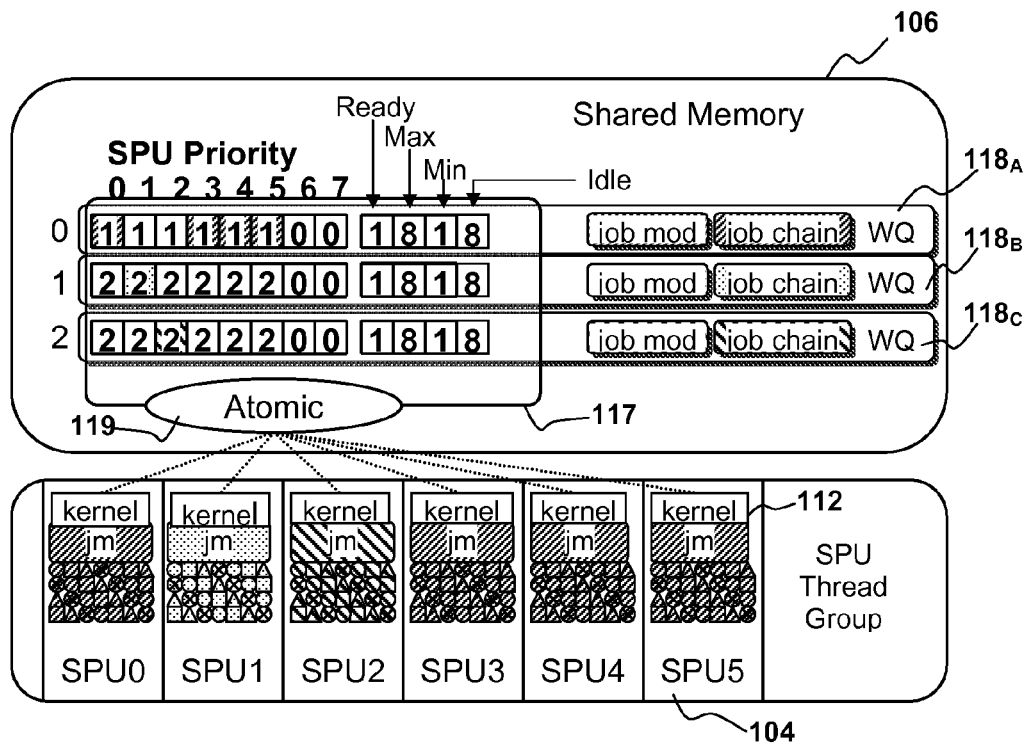

FIG. 2E illustrates an example of the effect of different values of Ready Count on the assignment of SPUs. In this example the priority table is the same as for FIG. 2D. However, the Ready count for Work Queue $118_A$ is equal to eight while the Ready Count values for Work Queues $118_B$, $118_C$ are both equal to one. Initially, SPU0 is assigned to Work Queue $118_A$, SPU1 is assigned to Work Queue $118_B$ and SPU2 is assigned to Work Queue $118_C$. Once this initial assignment has taken place, Ready Count=Contention=1 for Work Queues $118_B$, $118_C$. However, because Work Queue $118_A$ has a Ready Count that is less than its Contention, SPU3, SPU4 and SPU5 are preferentially assigned to Work Queue $118_A$.

The position of Ready Count in the hierarchy may be used assure that no particular Work Queue can monopolize all the available SPUs in the cell processor 100. For example, in FIG. 2F, the priority table 117 is configured such that Work Queue $118_A$ has priority 1 for all SPUs and Work Queues $118_B$, $118_C$ have priority 2. In addition Work Queues $118_A$, $118_B$, $118_C$ all have Ready Count=1, Maximum Contention=8, Minimum Contention=1 and Idle Request Count=8. Initially, SPUs are assigned to the Work Queues $118_A$, $118_B$, $118_C$ based on "readiness", i.e., on whether Contention is less than or equal to Ready Count. Since initially "Readiness" takes precedence over "Priority", SPU0 is assigned to Work Queue $118_A$, SPU1 is assigned to Work Queue $118_B$ and SPU2 is assigned to Work Queue $118_C$. At this point all three Work Queues have equal "Readiness". Consequently, based on the hierarchy described above, SPU3, SPU4, and SPU5 are subsequently assigned to Work Queue $118_A$ based on its lower priority value. It is noted that this assignment does not violate the "Schedulability" requirement since Contention=4 for Work Queue $118_A$, which is still less than Ready Count+Idle Request Count=9.

Figure 2G:
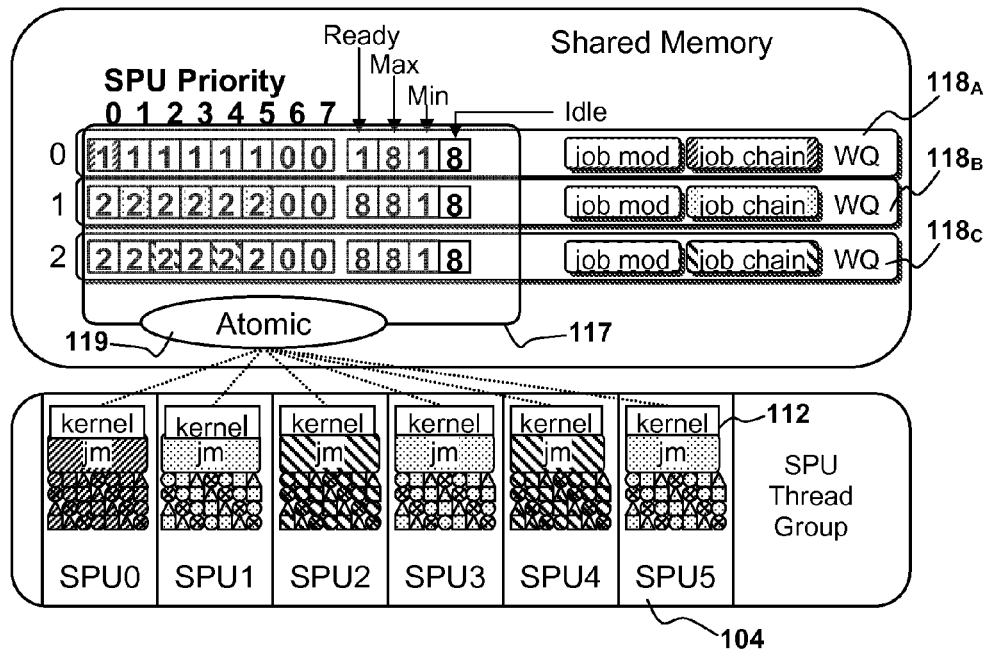

It is noted that depending on the Ready Count value for the Work Queues it is possible for more SPUs to be assigned to work of lower priority. For example, FIG. 2G depicts a situation For example, in FIG. 2F, the priority table 117 is configured such that Work Queue $118_A$ has priority 1 for all SPUs and Work Queues $118_B$, $118_C$ have priority 2. However, Work Queue $118_A$ has a Ready Count of "1", which Work Queues $118_B$, $118_C$ have Ready Counts of "8". Thus, initially SPU0 is assigned to Work Queue $118_A$, SPU1 is assigned to Work Queue $118_B$ and SPU2 is assigned to Work Queue $118_C$. At this point Readiness has been satisfied for Work Queue $118_A$ but not for Work Queues $118_B$, $118_C$. Thus, based on the hierarchy described above, the remaining available SPUs will be assigned to Work Queues for which Contention is less than Ready Count even if they are less preferable in terms of priority. It is further noted that, assuming equal policy module affinity, the assignment of the available SPUs is done in a way that attempts to balance contention between Work Queue $118_B$ and Work Queue $118_C$. This is because, given equal readiness, equal priority, equal policy module affinity and equal urgency, criterion 6 (balanced contention) applies.

Figure 2H:
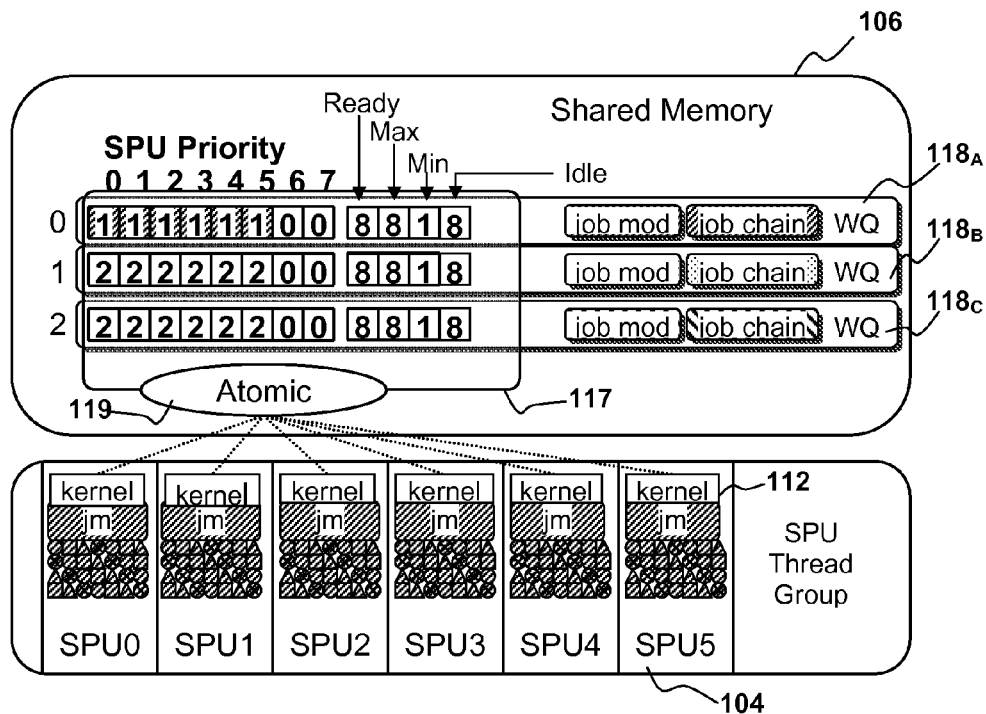

As described above, the hierarchy parameters in general, and the priority table 117 in particular, may be configured to prevent monopolization of SPUs by a single work queue. However, it is also possible within the context of this hierarchy to configure the parameters and priority table so that one Work Queue does monopolize all available SPUs. For example, as shown in FIG. 2H, the priority table 117 may be configured as follows. Work Queues $118_A$, $118_B$, $118_C$ all have Ready Count=8, Max Contention=8, Min Contention=1 and Idle Request Count=8. Work Queue 118$_A$ has Priority=1 for all SPUs while Work Queues 118$_B$, 118$_C$ have Priority=2 for all SPUs. Note that in this example all Work Queues have equal readiness until Ready Count=Contention. However, because the ready count is greater than or equal to the number of available SPUs this is true for all three Work Queues 118$_A$, 118$_B$, 118$_C$. Since no Work Queue is more "Ready" than any other, SPUs are assigned based on priority according to criterion 3 and all available SPUs are assigned to Work Queue 118$_A$.

Figure 3A:
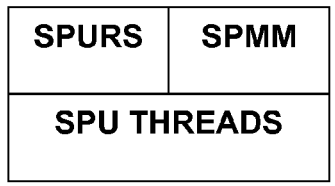
FIGS. 3A-3B are schematic diagrams illustrating software architecture for implementing embodiments of the present invention.

In embodiments of the present invention the SPMM 112 may be optimized for interoperability. Examples of such interoperability are depicted diagrammatically in FIGS. 3A-3F. For example, the SPMM 112 may be implemented as a particularly advantageous type of normal SPU thread as depicted in FIG. 3A. As such, a processing system that implements SPMM can interoperate with SPU threads or vice versa. In such an embodiment, SPU Threads can be useful to accommodate rare high priority preemptions.

Figure 3B:
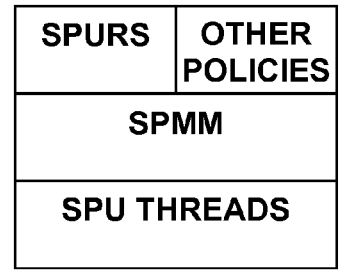

Furthermore, as depicted in FIG. 3B, SPURS may be implemented as one possible policy module within the context of SPMM. Thus, SPURS can operate on certain tasks where SPMM can replace SPURS code with something else for work on other tasks. SPMM can schedule multiple SPURS tasksets next to other SPU task systems, obeying priorities. Furthermore, it is possible for SPU Threads to implement both SPURS and SPMM as different possible SPU Threads. As such, embodiments of the present invention can be fully interoperable with both SPURS and SPU threads. The feature of scheduling across various programming models is important. This feature is especially useful for the Cell processor and other parallel processor devices with similar features.

As may be seen from FIG. 3B, SPMM may be incorporated into an SPU Task System such as SPURS. In such a case, the SPU Task System Instance referred to above may be designated a SPURS Instance, i.e., the context of one instantiation of SPURS including an associated SPU Thread Group. The SPMM 112 may be regarded as a SPURS Kernel, e.g., a relatively small amount of binary code that is resident on all SPURS SPU Threads that schedules the Work Queues 118 and loads Policy Modules to the SPU Local Store 110.

Figure 3C:
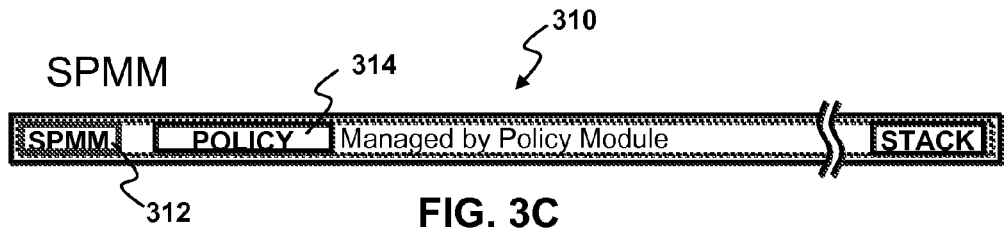
FIGS. 3C-3F are memory maps illustrating implementation of SPMM-based implementation of cell processing according to embodiments of the present invention.
Figure 3D:
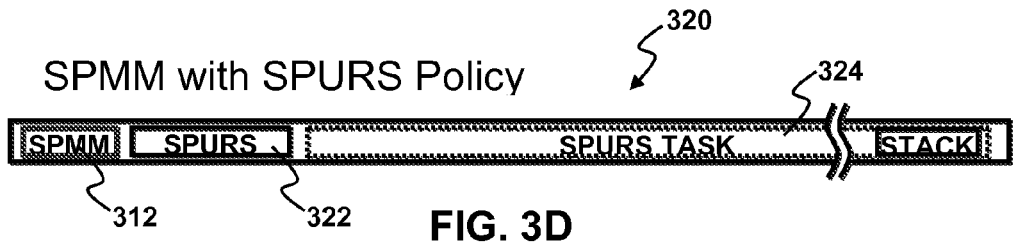

FIGS. 3C-3D depict memory maps for local storage on an SPU implementing different programming models. FIG. 3C depicts a memory map for local storage 310 of an SPU implementing SPMM. Here the SPMM kernel 312 loads a policy 314 and after that, SPU operation is managed by the policy until completion of work or a pre-empting event occurs. The policy 314 may be a custom policy, i.e., one that is specifically designed for a particular application or class of operations. Developers can create such custom polices to suit particular applications. FIG. 3D depicts a memory map for a local storage 320 in which SPURS 322 is implemented as a policy under SPMM 312. The SPURS policy 322 manages a SPURS taskset 324. SPURS can be modified to run on SPMM with same program start address for SPURS tasks. When running under SPMM 312, the SPURS policy 322 does not need to manage multiple tasksets.

Figure 3E:
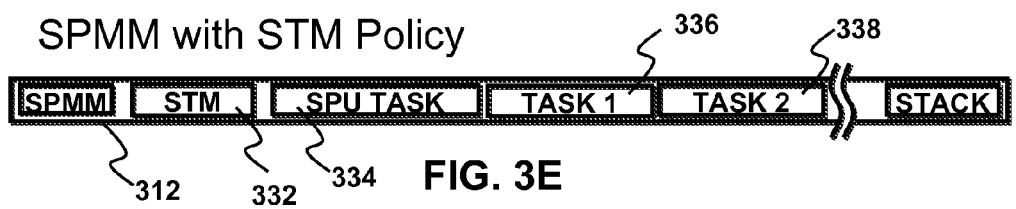

The advantage of SPMM is that SPURS and other policies can be easily switched between as the nature of the work requires. For example, FIG. 3E depicts a memory map for a local storage 320 in which SPU Task Manager (STM) 322 is implemented as a policy under SPMM 312. The STM policy 332 manages a STM taskset having a task code 334 and one or more sets of task data 336, 338 The STM policy 332 reads one or more task definitions stored in the main memory into the local storage 320. Based on information contained in the task definitions the SPU loads code and/or data related to the task definitions from the main memory into the local memory associated with the selected SPU. The selected SPU then performs one or more tasks using the code and/or data. STM can be modified to run on SPMM with same program start address for STM tasks. When running under SPMM 312, the STM policy 332 does not need to manage multiple tasksets. STM is described in detail in commonly-assigned U.S. patent application Ser. No. 11/238,087 entitled "SPU TASK MANAGER FOR CELL PROCESSOR" to John P. Bates, Payton R. White, Richard Stenson, Howard Berkey, Attila Vass and Mark Cerny, which is filed the same day as the present application, the entire disclosures of which are incorporated herein by reference.

Figure 3F:
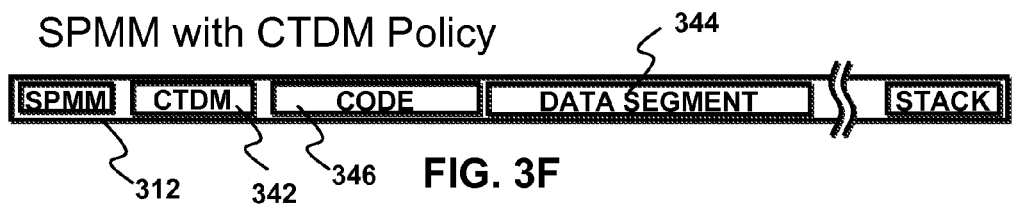

Another possible policy that may be loaded under SPMM is known as Cell Processor Task and Data Management (CTDM). FIG. 3F depicts a memory map for a local storage 320 in which a CTDM 342 is implemented as a policy under SPMM 312. The CTDM policy 342 allows the SPU to break up sets of data that are too large to fit in the local storage 320 into smaller segments 344 than can be processed by code 346 running on the SPU. The data can also be divided up into groups of a size suitable for processing on a subsequent processor such as a graphics card. CTDM is described in detail in commonly-assigned U.S. patent application Ser. No. 11/238,095 entitled "CELL PROCESSOR TASK AND DATA MANAGEMENT" to Richard B. Stenson and John P. Bates, which is filed the same day as the present application, the entire disclosures of which are incorporated herein by reference.

Embodiments of the present invention are the result of a broad understanding of existing SPU programming models. It is often the case that one model is never perfect for all applications. Consequently, engineers tend to develop custom programming models. Interoperability is not a problem when all the SPU code is written by the same company. However, interoperability can be a problem when middleware is needed that SPU code must interoperate efficiently.

Figure 4:
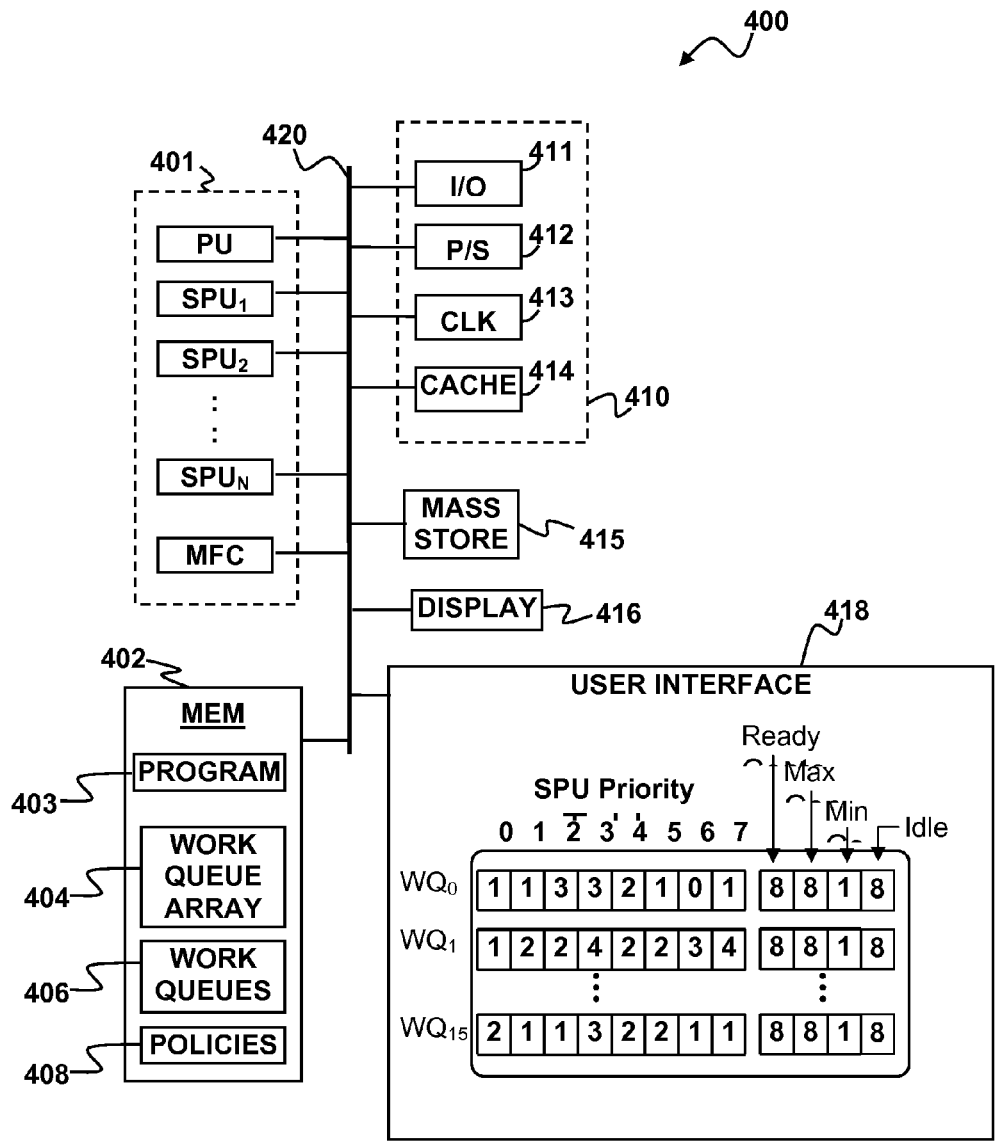
FIG. 4 is a block diagram of a data processing system according to an embodiment of the present invention.

Parallel processor units of the type depicted in FIG. 1 operating as described above may be implemented as part of a larger processing system 400, as depicted in FIG. 4. The system 400 may include a cell processor module 401 and a memory 402 (e.g., RAM, DRAM, ROM, and the like). In addition, the processing system 400 may have multiple cell processor modules 401. The cell processor module 401 generally includes one or more main processors PPU and one or more SPUs SPU$_1$, SPU$_2$ ... SPU$_N$ which may be configured to operate under the control of an SPMM as described above. The processor module 401 may also include a memory flow controller MFC. The cell processor module 401 may be a cell processor, e.g., of the type depicted in FIG. 1. The memory 402 includes data and code configured as described above. Specifically, the memory includes a work queue array 404, work queues 406 and policy modules 408 each of which may include code, data or some combination of both code and data as described above.

The system 400 may also include well-known support functions 410, such as input/output (I/O) elements 411, power supplies (P/S) 412, a clock (CLK) 413 and cache 414. The system 400 may optionally include a mass storage device 415 such as a disk drive, CD-ROM drive, tape drive, or the like to store programs and/or data. The controller may also optionally include a display unit 416 and user interface unit 418 to facilitate interaction between the controller 400 and a user. The display unit 416 may be in the form of a cathode ray tube (CRT) or flat panel screen that displays text, numerals, graphical symbols or images. The user interface 418 may include a keyboard, mouse, joystick, light pen or other device. The cell processor module 401, memory 402 and other components of the system 400 may exchange signals (e.g., code instructions and data) with each other via a system bus 420 as shown in FIG. 4.

As used herein, the term I/O generally refers to any program, operation or device that transfers data to or from the system 400 and to or from a peripheral device. Every transfer is an output from one device and an input into another. Peripheral devices include input-only devices, such as keyboards and mouses, output-only devices, such as printers as well as devices such as a writable CD-ROM that can act as both an input and an output device. The term "peripheral device" includes external devices, such as a mouse, keyboard, printer, monitor, external Zip drive or scanner as well as internal devices, such as a CD-ROM drive, CD-R drive or internal modem or other peripheral such as a flash memory reader/writer, hard drive.

By way of example and without loss of generality, the user interface 416 may be configured, e.g., by suitable programming, to allow a user to adjust relevant parameters of the work definitions in the work queue array 404. Specifically, the user interface 416 may allow the user to adjust values of Ready Count, Idle Request Count, Priority, Maximum Contention and Minimum Contention so that the user may optimize performance of the program 403 as it runs on the processor module 401. Such a capability may be particularly useful to users who are developers of the program 403 or portions thereof.

The processor module 401 may manage the performance of tasks in the work queues 406 in response to data and program code instructions of a main program 403 stored and retrieved by the memory 402 and executed by the processor module 401. Code portions of the program 403 may conform to any one of a number of different programming languages such as Assembly, C++, JAVA or a number of other languages. The processor module 401 forms a general-purpose computer that becomes a specific purpose computer when executing programs such as the program code 403. Although the program code 403 is described herein as being implemented in software and executed upon a general purpose computer, those skilled in the art will realize that the method of task management could alternatively be implemented using hardware such as an application specific integrated circuit (ASIC) or other hardware circuitry. As such, it should be understood that embodiments of the invention can be implemented, in whole or in part, in software, hardware or some combination of both. In one embodiment, among others, the program code 403 may include a set of processor readable instructions that implement a method having features in common with the method 200 of FIG. 2A and/or the algorithm 220 of FIG. 2B.

Although the above discussion addresses cell processors, embodiments of the present invention may be implemented using any multi-processor scheme. Specifically, embodiments of the invention may be implemented in various configurations of parallel processors. For example, the invention herein may be implemented in a configuration with multiple SPU-like processors, but no PPU-like processor. The embodiments may be implemented in a parallel processor environment having one or more main processors and more or fewer than eight SPUs (or similar processors with local memories). Embodiments of the present invention provide a high-performance SPU management solution that is SPU-driven with low usage of SPU local storage space. As described above, embodiments of the present invention enable parallel SPU processing of work on multiple SPUs. Furthermore, the modular nature of the SPMM model is desirable in that it allows various programming models and task systems to interoperate.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. In a processor system having one or more central processors and one or more secondary processing elements, each secondary processing element having a processor and a local memory, a method for managing code and data on one or more of the secondary processing elements, the method comprising the steps of:

under control a policy module manager running on one or more of the secondary processing elements, assigning a selected one or more work queues from a main memory to a selected one or more of the secondary processing elements according to a hierarchy of precedence by determining whether one or more work queues are schedulable, and have readiness, determining a per-secondary processing element priority value for the one or more work queues, determining a work queue affinity for the one or more work queues and determining an urgency for the one or more work queues and assigning the selected one or more work queues to the selected one or more secondary processing elements according to schedulability, readiness, affinity, and urgency, wherein determining the urgency includes determining a contention for the one or more work queues and determining a minimum contention for the selected one or more work queues, wherein assigning the selected one or more work queues includes comparing a particular contention for a particular one of the selected one or more work queues to a corresponding minimum contention and preferentially assigning the work queue if the particular contention is greater than zero but less than the corresponding minimum contention;

loading a policy module for the selected one or more work queues to the selected one or more secondary processing elements;

interpreting the selected one or more work queues with the policy module;

under control of the policy module, loading work from one or more of the selected one or more work queues into the local memory of the selected one or more secondary processing elements;

performing the work with the selected one or more secondary processing elements; and after completing the work or upon a pre-emption, returning control of the selected one or more secondary processing elements to the policy module manager.

2. The method of claim 1 wherein loading the policy module from the main memory includes reading from a work definition in a work queue array a memory address of the policy module in the main memory.

3. The method of claim 1 wherein loading the work from the selected one or more work queues includes reading from a work definition in a work queue array a memory address of the work in the main memory.

4. The method of claim 3 wherein the memory address of the work contains both code and data.

5. The method of claim 1 wherein determining whether the particular one of the one or more work queues is schedulable includes determining a Contention and/or a Priority and/or a Ready Count and/or a Maximum Contention and/or an Idle Request Count for the particular one of the work queues.

6. The method of claim 5 wherein determining whether a particular one of the work queues is schedulable includes determining whether:
Priority=0, or
Ready Count=0, or
Contention≧Maximum Contention, or
Contention≧(Ready Count+Idle Request Count).

7. The method of claim 1 wherein determining whether one or more work queues have readiness includes determining a Contention and a Ready Count for the one or more work queues, wherein performing the work includes preferentially assigning one or more secondary processing elements to one or more of one or more work queues that are schedulable and for which Contention is less than Ready Count.

8. The method of claim 7 wherein preferentially assigning one or more secondary processing elements to the one or more work queues that are schedulable and for which Contention is less than Ready Count includes assigning one or more secondary processing elements to a schedulable work queue for which Contention is less than Ready Count and not assigning secondary processing elements to a schedulable work queue for which Contention is not less than Ready Count.

9. The method of claim 7, further comprising determining an Idle Request Count for a particular work queue and wherein performing the work includes assigning to the particular work queue a number of secondary processing elements less than or equal to a sum of a Ready Count value for the particular work queue plus the Idle Request Count.

10. The method of claim 1, wherein assigning the selected one or more work queues from a main memory to a selected one or more of the secondary processing elements according to the hierarchy of precedence includes determining whether one or more work queues are schedulable and have readiness and determining a secondary processing element priority value for one or more schedulable work queues having readiness.

11. The method of claim 10 wherein assigning the selected one or more work queues includes, for work queues that are schedulable and have readiness, assigning a particular secondary processing element to a work queue having a more preferred value of priority for the particular secondary processing element.

12. The method of claim 1, wherein assigning the selected one or more work queues from a main memory to a selected one or more of the secondary processing elements according to the hierarchy of precedence includes determining whether one or more work queues are schedulable and have readiness, determining a per-secondary processing element priority value for one or more schedulable work queues having readiness and determining whether code and/or data for any of the work queue is already loaded into any of the secondary processing elements.

13. The method of claim 12, wherein assigning the selected one or more work queues includes, for two or more schedulable work queues having readiness and equal priority for a particular secondary processing element, preferentially assigning the particular secondary processing element to a work queue of the two or more schedulable work queues having readiness and equal priority for which code and/or data is already loaded into a local store of the particular secondary processing element.

14. The method of claim 1, wherein assigning the selected one or more work queues, for two or more work queues that are schedulable, have readiness, equal priority and equal work queue affinity for a particular secondary processing element includes preferentially assigning the particular secondary processing element to a work queue of the two or more particular work queues having a greater urgency.

15. The method of claim 1 wherein preferentially assigning the particular secondary processing element to a work queue of the two or more particular work queues having a greater urgency, includes assigning the particular secondary processing element to a work queue for which the contention is greater than zero but less than the minimum contention over a work queue for which this is not the case.

16. The method of claim 1, wherein assigning the selected one or more work queues from a main memory to a selected one or more of the secondary processing elements according to the hierarchy of precedence includes determining whether one or more work queues are schedulable, and have readiness, determining a per-secondary processing element priority value for the one or more work queues, determining a work queue affinity for the one or more work queues and determining an urgency for the one or more work queues, and determining a Contention for the one or more work queues.

17. The method of claim 16, wherein assigning the selected one or more work queues includes, for two or more particular work queues that are schedulable, have readiness, equal priority and equal work queue affinity for a particular secondary processing element and equal urgency, assigning the two or more particular work queues to two or more available secondary processing elements in a manner that balances Contention of the two or more particular work queues amongst the two or more available secondary processing elements.

18. The method of claim 1 wherein assigning the selected one or more work queues from a main memory to a selected one or more of the secondary processing elements according to the hierarchy of precedence includes determining whether one or more work queues are schedulable, and have readiness, determining a per-secondary processing element priority value for the one or more work queues, determining a work queue affinity for the one or more work queues and determining an urgency for the one or more work queues, determining a Contention for the one or more work queues and determining a per-secondary processing element policy module affinity for the one or more work queues.

19. The method of claim 18 wherein determining a per-secondary processing element policy module affinity for the one or more work queues includes determining whether a particular secondary processing element already has a policy module for a particular work queue loaded into a local store of the particular secondary processing element.

20. The method of claim 18 wherein assigning the selected one or more work queues, for two or more particular work queues that are schedulable, have readiness, equal priority and equal work queue affinity for a particular secondary processing element, equal urgency and for which Contention is balanced, preferentially assigning a particular work queue to a secondary processing element having policy module affinity with the particular secondary processing element.

21. The method of claim 1 wherein assigning the selected one or more work queues from a main memory to a selected one or more of the secondary processing elements according to the hierarchy of precedence includes determining whether one or more work queues are schedulable, and have readiness, determining a per-secondary processing element priority value for the one or more work queues, determining a work queue affinity for the one or more work queues and determining an urgency for the one or more work queues, determining a Contention for the one or more work queues determining a per-secondary processing element policy module affinity for the one or more work queues and determining a Workload ID for the one or more work queues.

22. The method of claim 21 wherein assigning the selected one or more work queues includes, for two or more particular work queues that are schedulable and have readiness, have equal priority and equal work queue affinity and equal policy module affinity for a particular secondary processing element, have equal urgency and for which Contention is balanced, preferentially assigning a particular work queue having a more preferred Workload ID to the particular secondary processing element.

23. A processor, comprising:
a main memory;
a central processor coupled to the main memory;
one or more secondary processing units coupled to the central processor and main memory, wherein each secondary processing element has a processor unit and a local memory,
a policy module manager running on one or more of the secondary processing elements, the policy module manager being configured to assign a selected one or more work queues from the main memory to a selected one or more of the secondary processing elements according to a hierarchy of precedence by determining whether one or more work queues are schedulable, and have readiness, determining a per-secondary processing element priority value for the one or more work queues, determining a work queue affinity for the one or more work queues and determining an urgency for the one or more work queues and assigning the selected one or more work queues to the selected one or more secondary processing elements according to schedulability, readiness, affinity, and urgency, wherein determining the urgency includes determining a contention for the one or more work queues and determining a minimum contention for the one or more work queues, wherein the contention is a number of secondary processing elements working on the work queue, wherein the minimum contention represents a minimum number of secondary processors needed to process the work queue, wherein assigning the selected one or more work queues includes comparing a particular contention for a particular one of the selected one or more work queues to a corresponding minimum contention and preferentially assigning the work queue if the particular contention is greater than zero but less than the corresponding minimum contention,
wherein the policy module manager is configured to load a work queue policy module for the selected one or more work queues to the selected one or more secondary processing elements, and
wherein the policy module is configured to load, interpret and process work from one or more of the selected one or more work queues on the selected one or more secondary processing elements and, after completing the work or upon a pre-emption, returning control of the selected one or more secondary processing element to the policy module manager.

24. The processor of claim 23 wherein the main memory includes one more work queue arrays, wherein each work queue includes one or more work definitions, each work definition being associated with a work queue.

25. The processor of claim 24 wherein each of the one or more work queue arrays includes exactly sixteen work definitions.

26. The processor of claim 24 wherein each work definition includes a memory address of a work queue and a memory address of a policy definition.

27. The processor of claim 26 wherein each work definition includes a per-se per-secondary processing element Priority value.

28. The processor of claim 26 wherein each work definition includes a Ready Count value.

29. The processor of claim 26 wherein each work definition includes Maximum Allowed Contention value.

30. The processor of claim 26 wherein each work definition includes an Idle Request Count value.

31. The processor of claim 26 wherein the policy definition includes an address of a Policy Module secondary processor element code image.

32. The processor of claim 26 wherein the memory address of the work queue includes both code and data.

33. The processor of claim 23, wherein the hierarchy of precedence is configured such that Schedulability of a work queue takes precedence over all other considerations in assigning the selected one or more work queues from the main memory to the selected one or more of the secondary processing elements.

34. The processor of claim 23, wherein the hierarchy of precedence is configured such that Schedulability of a work queue takes precedence over Readiness of the work queue and Readiness of the work queue takes precedence over all other considerations in assigning the selected one or more work queues from the main memory to the selected one or more of the secondary processing elements.

35. The processor of claim 23, wherein the hierarchy of precedence is configured such that Schedulability of a work queue takes precedence over Readiness, Readiness of the work queue takes precedence over per-secondary processing element Priority of the work queue and per-secondary processing element Priority of the work queue takes precedence over all other considerations in assigning the selected one or more work queues from the main memory to the selected one or more of the secondary processing elements.

36. The processor of claim 23, wherein the hierarchy of precedence is configured such that Schedulability of a work queue takes precedence over Readiness of the work queue, Readiness of the work queue takes precedence over per-secondary processing element Priority of the work queue, Priority of the work queue takes precedence over Work queue Affinity of the work queue and Work Queue Affinity of the work queue takes precedence over all other considerations in assigning the selected one or more work queues from the main memory to the selected one or more of the secondary processing elements.

37. The processor of claim 23, wherein the hierarchy of precedence is configured such that Schedulability of a work queue takes precedence over Readiness of the work queue, Readiness of the work queue takes precedence over per-secondary processing element Priority of the work queue, per-secondary processing element Priority of the work queue takes precedence over Work Queue Affinity of the work queue, Work Queue Affinity of the work queue takes precedence over Balanced Contention of the one or more selected work queues and Balanced Contention of the selected one or more work queues takes precedence over all other considerations in assigning the selected one or more work queues from the main memory to the selected one or more of the secondary processing elements.

38. The processor of claim 23, wherein the hierarchy of precedence is configured such that Schedulability of a work queue takes precedence over Readiness of the work queue, Readiness of the work queue takes precedence over per-secondary processing element Priority of the work queue, per-secondary processing element Priority of the work queue takes precedence over Work Queue of the work queue, Work Queue Affinity of the work queue takes precedence over Balanced Contention of the one or more selected work queues and Balanced Contention of the selected one or more work queues takes precedence over Policy Module Affinity of the work queue and Policy Module Affinity of the work queue takes precedence over all other considerations in assigning the selected one or more work queues from the main memory to the selected one or more of the secondary processing elements.

39. The processor of claim 23, wherein the hierarchy of precedence is configured such that Schedulability of a work queue takes precedence over Readiness of the work queue, Readiness of the work queue takes precedence over per-secondary processing element Priority of the work queue, per-secondary processing element Priority of the work queue takes precedence over Work Queue Affinity of the work queue, Work Queue Affinity of the work queue takes precedence over Balanced Contention of the one or more selected work queues and Balanced Contention of the selected one or more work queues takes precedence over Policy Module Affinity of the work queue and Policy Module Affinity of the work queue takes precedence over Workload ID for the work queue and Workload ID of the work queue takes precedence over all other considerations in assigning the selected one or more work queues from the main memory to the selected one or more of the secondary processing elements.

40. The processor of claim 23, further comprising a user interface, wherein the user interface is adapted to allow a user to adjust one or more parameters of the selected one or more work queues.

41. A data processing system, comprising:
one or more processors each processor having a main memory, a central processor unit, and one or more secondary processing elements each secondary processing element having a processor and a local memory, wherein the main memory, central processor unit, and secondary processing elements are coupled to each other by a data bus;
wherein the main memory and/or local memory include processor executable instructions for implementing a method for managing code and data on one or more of the secondary processing elements, the method comprising the steps of:
under control of a policy module manager running on one or more of the secondary processing elements, assigning a selected one or more work queues from a main memory to a selected one or more of the secondary processing elements according to a hierarchy of precedence by determining whether one or more work queues are schedulable, and have readiness, determining a per-secondary processing element priority value for the one or more work queues, determining a work queue affinity for the one or more work queues and determining an urgency for the one or more work queues and assigning the selected one or more work queues to the selected one or more secondary processing elements according to schedulability, readiness, affinity, and urgency, wherein determining the urgency includes determining a Contention for the one or more work queues and determining a minimum contention for the one or more work queues, wherein assigning the selected one or more work queues includes comparing a particular contention for a particular one of the selected one or more work queues to a corresponding minimum contention and preferentially assigning the work queue if the particular contention is greater than zero but less than the corresponding minimum contention;
loading a policy module for the selected one or more work queues to the selected one or more secondary processing elements;
interpreting the selected one or more of the selected one or more work queues with the policy module;
under control of the policy module, loading work from one or more of the selected one or more work queues into the local memory of the selected one or more secondary processing elements;
performing the one or more tasks with the selected one or more secondary processing elements; and
after completing the one or more tasks or upon a pre-emption, returning control of the one or more secondary processing elements to the policy module manager.

42. A non-transitory processor readable storage medium having embodied therein a set of processor readable instructions for implementing a method for managing code and data on one or more processing elements in a processor having one or more central processor units and one or more secondary processing elements, each secondary processing element having a processor and a local memory, the method comprising the steps of:
under control of a policy module manager running on one or more of the secondary processing elements, assigning a selected one or more work queues from a main memory to a selected one or more of the secondary processing elements according to a hierarchy of precedence by determining whether one or more work queues are schedulable, and have readiness, determining a per-secondary processing element priority value for the one or more work queues, determining a work queue affinity for the one or more work queues and determining an urgency for the one or more work queues and assigning the selected one or more work queues to the selected one or more secondary processing elements according to schedulability, readiness, affinity, and urgency, wherein determining the urgency includes determining a contention for the one or more work queues and determining a minimum contention for the one or more work queues, wherein assigning the selected one or more work queues includes comparing a particular contention for a particular one of the selected one or more work queues to a corresponding minimum contention and preferentially assigning the work queue if the particular contention is greater than zero but less than the corresponding minimum contention;
loading a policy module for the selected one or more work queues to the selected one or more secondary processing elements;
interpreting the selected one or more of the selected one or more work queues with the policy module;
under control of the policy module, loading work from one or more of the selected one or more work queues into the local memory of the selected one or more secondary processing elements;
performing the one or more tasks with the selected one or more secondary processing elements; and
after completing the one or more tasks or upon a pre-emption, returning control of the one or more secondary processing elements to the policy module manager.

\* \* \* \* \*